United States Patent
Xu et al.

(10) Patent No.: US 11,455,278 B2
(45) Date of Patent: *Sep. 27, 2022

(54) WORKFLOW FUNCTIONS OF CONTENT MANAGEMENT SYSTEM ENFORCED BY CLIENT DEVICE

(71) Applicant: Dropbox, Inc., San Francisco, CA (US)

(72) Inventors: Tony Xu, Redmond, WA (US); Kevin Grey, Bellevue, WA (US); Sergei Vorobev, Seattle, WA (US); Haichen Liu, Seattle, WA (US); Stephen Eisner, Seattle, WA (US); Alexandra Harris, Seattle, WA (US); Blake Lucchesi, Seattle, WA (US); Waqas Sheikh, Issaquah, WA (US); Royce Ausburn, San Francisco, CA (US); Panagiotis Athanasiou, London (GB); Zach Johnston, San Francisco, CA (US); Narmada Jayasankar, Cupertino, CA (US); Vinod Valloppillil, Berkeley, CA (US)

(73) Assignee: Dropbox, Inc., San Francisco, CA (US)

( * ) Notice: Subject to any disclaimer, the term of this patent is extended or adjusted under 35 U.S.C. 154(b) by 106 days.

This patent is subject to a terminal disclaimer.

(21) Appl. No.: 16/871,927

(22) Filed: May 11, 2020

(65) Prior Publication Data

US 2020/0272602 A1 Aug. 27, 2020

Related U.S. Application Data

(63) Continuation of application No. 16/182,040, filed on Nov. 6, 2018, now Pat. No. 10,649,960, which is a
(Continued)

(51) Int. Cl.
*G06F 16/16* (2019.01)
*G06F 3/0484* (2022.01)
(Continued)

(52) U.S. Cl.
CPC .......... *G06F 16/168* (2019.01); *G06F 3/0484* (2013.01); *G06F 16/176* (2019.01);
(Continued)

(58) Field of Classification Search
CPC .... G06F 16/168; G06F 16/176; G06F 21/604; G06F 3/0484; G06F 3/04817;
(Continued)

(56) References Cited

U.S. PATENT DOCUMENTS 5,867,160 A * 2/1999 Kraft, IV .............. G06F 9/4843
715/803
6,778,668 B1 8/2004 Nielsen
(Continued)

FOREIGN PATENT DOCUMENTS

EP 0398496 A2 11/1990
EP 0278312 B1 10/1994
(Continued)

OTHER PUBLICATIONS

International Appl. No. PCT/US2018/047506, International Preliminary Report on Patentability dated Apr. 30, 2020, 12 pages.
(Continued)

*Primary Examiner* — J. Brant Murphy
(74) *Attorney, Agent, or Firm* — Polsinelli PC

(57) ABSTRACT

The disclosed technology addresses the need in the art for providing workflow controls to shared content items stored on client devices, and enforcing content item check outs or content item locks for shared content items stored and accessed on client devices. The present technology further includes automatically locking a shared content item that is edited on a client device so that other team members cannot modify the content item. Accordingly, the present technology improves upon existing systems that provide workflow controls such as file check-in and checkout functionality by
(Continued)

permitting users to access content items directly from the file system of their client device, and by providing automatic checkout and check-in functionality.

17 Claims, 14 Drawing Sheets

Related U.S. Application Data continuation of application No. 15/785,178, filed on Oct. 16, 2017, now Pat. No. 10,331,623, and a continuation of application No. 15/785,216, filed on Oct. 16, 2017, now Pat. No. 10,140,467.

(51) Int. Cl.
| | |
|---|---|
| *G06F 21/60* | (2013.01) |
| *G06F 16/176* | (2019.01) |
| *G06F 16/17* | (2019.01) |
| *G06Q 10/10* | (2012.01) |
| G06F 3/04842 | (2022.01) |
| G06F 3/04817 | (2022.01) |
| H04L 67/1095 | (2022.01) |
| H04L 67/01 | (2022.01) |

(52) U.S. Cl.
CPC ...... *G06F 16/1734* (2019.01); *G06F 16/1774* (2019.01); *G06F 21/604* (2013.01); *G06Q 10/103* (2013.01); *G06F 3/04817* (2013.01); *G06F 3/04842* (2013.01); *H04L 67/01* (2022.05); *H04L 67/1095* (2013.01)

(58) Field of Classification Search
CPC ............. G06F 3/04842; G06F 16/1734; G06F 16/1774; H04L 67/1095; H04L 67/42; G06Q 10/103
See application file for complete search history.

(56) References Cited

U.S. PATENT DOCUMENTS

| | | | |
|---|---|---|---|
| 6,826,707 B1 | 11/2004 | Stevens et al. | |
| 7,769,794 B2 | 8/2010 | Moore et al. | |
| 7,792,300 B1 | 9/2010 | Caronni | |
| 7,945,589 B1 | 5/2011 | Weiss et al. | |
| 8,387,047 B1 | 2/2013 | Mazin et al. | |
| 8,484,578 B2* | 7/2013 | Gordner | G06F 3/04845 715/808 |
| 8,561,097 B2* | 10/2013 | Alhadeff | H04H 60/31 725/22 |
| 8,817,053 B2 | 8/2014 | Robert et al. | |
| 9,075,954 B2* | 7/2015 | Kirigin | G06F 16/178 |
| 9,111,110 B2* | 8/2015 | Subramani | G06F 21/6218 |
| 9,189,756 B2* | 11/2015 | Gilbert | G06Q 10/06 |
| 9,288,299 B2* | 3/2016 | Wang | H04M 1/72403 |
| 9,294,485 B2* | 3/2016 | Allain | H04L 63/10 |
| 9,325,571 B2* | 4/2016 | Chen | G06F 9/468 |
| 9,418,356 B2* | 8/2016 | Crevier | G06F 21/62 |
| 9,423,922 B2* | 8/2016 | Welinder | H04L 51/04 |
| 9,473,532 B2* | 10/2016 | Pearl | G06Q 10/103 |
| 9,510,182 B2* | 11/2016 | Diedrich | H04W 12/37 |
| 9,525,735 B2* | 12/2016 | Das | H04L 67/1097 |
| 9,552,369 B2* | 1/2017 | Maze | G06F 16/93 |
| 9,615,058 B2* | 4/2017 | Mattson | G06F 3/04842 |
| 9,652,741 B2* | 5/2017 | Goldberg | G06Q 10/101 |
| 9,654,585 B2* | 5/2017 | Rajaram | G06F 16/1774 |
| 9,715,534 B2* | 7/2017 | Beausoleil | G06F 16/178 |
| 10,007,405 B2* | 6/2018 | D'Amore | G06Q 10/06 |
| 10,038,731 B2* | 7/2018 | Pearl | H04L 41/0823 |
| 2002/0099789 A1* | 7/2002 | Rudolph | G06F 16/40 709/213 |
| 2003/0164855 A1* | 9/2003 | Grant | G06F 16/51 715/763 |
| 2004/0044774 A1* | 3/2004 | Mangalik | H04L 67/2819 709/227 |
| 2004/0139178 A1 | 7/2004 | Mendez et al. | |
| 2005/0086296 A1* | 4/2005 | Chi | G06Q 10/10 709/203 |
| 2005/0088629 A1* | 4/2005 | Greenberg | G03B 21/26 353/94 |
| 2005/0234866 A1 | 10/2005 | Kyler | |
| 2006/0090171 A1 | 4/2006 | Laborczfalvi et al. | |
| 2006/0150104 A1 | 7/2006 | Lira et al. | |
| 2006/0212746 A1 | 9/2006 | Amegadzie et al. | |
| 2007/0006327 A1* | 1/2007 | Lal | G06F 21/10 726/31 |
| 2007/0078930 A1* | 4/2007 | Ludwig | G06Q 10/10 709/204 |
| 2007/0156670 A1* | 7/2007 | Lim | G06F 9/468 |
| 2009/0024674 A1 | 1/2009 | Gallagher et al. | |
| 2010/0017713 A1* | 1/2010 | Igarashi | H04N 7/17318 715/716 |
| 2010/0205537 A1* | 8/2010 | Knighton | H04N 7/15 715/751 |
| 2010/0229085 A1* | 9/2010 | Nelson | G09B 19/00 715/255 |
| 2010/0241611 A1 | 9/2010 | Zuber | |
| 2010/0241972 A1* | 9/2010 | Spataro | G06F 16/93 715/753 |
| 2010/0262977 A1* | 10/2010 | Havemose | G06F 9/54 719/310 |
| 2011/0072062 A1* | 3/2011 | Guarraci | G06F 16/27 707/831 |
| 2011/0167353 A1* | 7/2011 | Grosz | G06F 3/14 715/738 |
| 2011/0239129 A1* | 9/2011 | Kummerfeld | G06F 3/0488 715/750 |
| 2011/0239135 A1* | 9/2011 | Spataro | G06F 16/93 715/753 |
| 2012/0089610 A1* | 4/2012 | Agrawal | G06Q 50/01 707/741 |
| 2012/0222133 A1* | 8/2012 | Kidron | G06F 15/167 726/28 |
| 2012/0233205 A1* | 9/2012 | McDermott | G06F 16/93 707/769 |
| 2012/0240061 A1* | 9/2012 | Hillenius | G06Q 10/06398 715/753 |
| 2012/0296790 A1* | 11/2012 | Robb | G06F 9/54 705/35 |
| 2012/0331394 A1* | 12/2012 | Trombley-Shapiro | H04L 67/06 715/748 |
| 2013/0013560 A1* | 1/2013 | Goldberg | G06Q 10/101 707/634 |
| 2013/0019028 A1* | 1/2013 | Myers | H04L 67/18 709/246 |
| 2013/0080919 A1* | 3/2013 | Kiang | H04L 67/327 715/753 |
| 2013/0185348 A1 | 7/2013 | Hall et al. | |
| 2014/0007181 A1 | 1/2014 | Sarin et al. | |
| 2014/0026182 A1* | 1/2014 | Pearl | G06F 21/554 726/1 |
| 2014/0029751 A1 | 1/2014 | Swineford et al. | |
| 2014/0067865 A1* | 3/2014 | Kirigin | H04L 63/168 707/783 |
| 2014/0082071 A1* | 3/2014 | Rexer | G06F 21/6245 709/204 |
| 2014/0188869 A1* | 7/2014 | Beckmann | G06F 16/22 707/736 |
| 2014/0195516 A1* | 7/2014 | Balakrishnan | G06F 16/168 707/722 |
| 2014/0215551 A1* | 7/2014 | Allain | H04L 63/104 726/1 |
| 2014/0215568 A1* | 7/2014 | Kirigin | G06F 21/645 726/4 |
| 2014/0229729 A1 | 8/2014 | Roth et al. | |
| 2014/0230009 A1* | 8/2014 | Subramani | H04L 67/10 726/1 |
| 2014/0258968 A1 | 9/2014 | Brown et al. | |

(56) References Cited

U.S. PATENT DOCUMENTS

| | | | |
|---|---|---|---|
| 2014/0289645 A1 | 9/2014 | Megiddo et al. | |
| 2014/0359085 A1* | 12/2014 | Chen | H04L 67/1095 709/220 |
| 2015/0001301 A1 | 1/2015 | Ouyang | |
| 2015/0012616 A1* | 1/2015 | Pearl | G06Q 10/101 709/219 |
| 2015/0013014 A1 | 1/2015 | Daniel et al. | |
| 2015/0081624 A1 | 3/2015 | Masse et al. | |
| 2015/0127754 A1 | 5/2015 | Clark et al. | |
| 2015/0135337 A1* | 5/2015 | Fushman | H04L 67/02 726/30 |
| 2015/0163206 A1* | 6/2015 | McCarthy | H04L 63/06 713/171 |
| 2015/0213051 A1 | 7/2015 | Wang et al. | |
| 2015/0222615 A1* | 8/2015 | Allain | H04L 63/08 726/4 |
| 2015/0261974 A1* | 9/2015 | Kirigin | G06F 21/00 726/29 |
| 2015/0278168 A1* | 10/2015 | Hawa | H04L 67/2842 715/205 |
| 2015/0302338 A1 | 10/2015 | Zaveri | |
| 2015/0310188 A1* | 10/2015 | Ford | H04L 63/0428 726/28 |
| 2015/0319175 A1* | 11/2015 | Subramani | G06F 16/955 726/1 |
| 2016/0359987 A1* | 12/2016 | Laliberte | H04W 4/14 |
| 2017/0048285 A1* | 2/2017 | Pearl | G06F 16/11 |
| 2018/0039652 A1* | 2/2018 | Nichols | G06F 16/11 |

FOREIGN PATENT DOCUMENTS

| | | | |
|---|---|---|---|
| GB | 2529259 | A | 2/2016 |
| JP | 2000250799 | A | 9/2000 |
| JP | 2004254193 | A | 9/2004 |
| JP | 2007056827 | A | 3/2007 |
| JP | 2009015766 | A | 1/2009 |
| JP | 2011192241 | A | 9/2011 |
| JP | 2012058960 | A | 3/2012 |
| JP | 2012073934 | A | 4/2012 |
| JP | 2013190884 | A | 9/2013 |
| JP | 2016520919 | A | 7/2016 |
| JP | 2016184404 | A | 10/2016 |
| JP | 2017527055 | A | 9/2017 |

OTHER PUBLICATIONS

International Search Report and Written Opinion for PCT Application No. PCT/US2018/047506, dated Oct. 4, 2018, 16 pages.
Non-Final Office Action from U.S. Appl. No. 16/182,040, dated Oct. 3, 2019, 24 pages.
Non-Final Office Action from U.S. Appl. No. 16/370,063, dated Dec. 12, 2019, 16 pages.
Notice of Allowance from U.S. Appl. No. 16/182,040, dated Feb. 25, 2020, 5 pages.
Notice of Allowance from U.S. Appl. No. 16/370,063, dated Apr. 22, 2020, 9 pages.
Ramaswamy L., et al., Cache Clouds: Cooperative Caching of Dynamic Documents in EDGE Networks, Proceedings of the 25th IEEE International Conference on Distributed Computing Systems, 1063-6927/05, 2005, pp. 1-10.
Ramaswamy L., et al., "Scalable Delivery of Dynamic Content using a Coperative EDGE Cache Grid," IEEE Computer Society, 1041-4347/07, vol. 19, No. 5, May 2007, pp. 1-17.
Yan T., et al., Fast App Launching for Mobile Devices using Predictive user Context, MobiSys '12, Jun. 25-29, 2012, Aug. 12, 2006, 14 pages.
Examination Report No. 2, for Australian Application No. 2017387765, dated Jun. 3, 2020, 5 pages.
Examination Report No. 2, for Australian Application No. 2017387766, dated Jun. 2, 2020, 7 pages.
Examination Report No. 1, for Australian Application No. 2017387765, dated Feb. 26, 2020, 3 pages.
Examination Report No. 1, for Australian Application No. 2017387766, dated Feb. 26, 2020, 3 pages.
International Search Report and Written Opinion for PCT Application No. PCT/US2017/059722 dated Jun. 28, 2018, 13 pages.
International Search Report and Written Opinion for PCT Application No. PCT/US2017/059730 dated Jun. 28, 2018, 14 pages.
Non-Final Office Action from U.S. Appl. No. 15/475,735, dated Oct. 15, 2019, 20 pages.
Notice of Allowance from U.S. Appl. No. 15/475,735, dated Apr. 29, 2020, 12 pages.
Notice of Allowance from U.S. Appl. No. 15/475,886, dated Oct. 29, 2019, 8 pages.
Notice of Allowance from U.S. Appl. No. 15/476,059, dated Jan. 30, 2020, 6 pages.
Notice of Allowance from U.S. Appl. No. 15/476,059, dated Sep. 30, 2019, 5 pages.
Notice of Allowance from U.S. Appl. No. 15/475,886, dated Jan. 8, 2020, 8 pages.
Communication Pursuant to Article 94(3) EPC for European Application No. 18762994.4 dated Dec. 23, 2020, 8 pages.
Examination Report No. 3, for Australian Application No. 2017387765, dated Sep. 29, 2020, 5 pages.
Kung S et al., "Tortoise SVN—Chapter 4. Daily User Guide," XP055761278, Jun. 7, 2015, retrieved from https://tortoisesvn.net/docs/release/TortoiseSVN_en/tsvn-dug-locking.html on Dec. 18, 2020, 4 pages.
Notice of Acceptance for Australian Application No. 2017387765 dated Feb. 16, 2021, 3 pages.
Notice of acceptance for Australian patent application No. 2017387766 dated Oct. 7, 2020, 3 pages.
Communication pursuant to rule 164(2)(b) and article 94(3) EPC for European Application No. 17844608.4 dated Jul. 28, 2020, 9 pages.
Communication pursuant to rule 164(2)(b) and article 94(3) EPC for European Application No. 17844645.6 dated Jul. 28, 2020, 12 pages.
Notice of Reasons for Refusal for Japanese Application No. 2019-512632 dated Jul. 6, 2020, 13 pages.
Notice of Reasons for Refusal for Japanese Application No. 2019-512633 dated Jul. 3, 2020, 11 pages.
Non-Final Office Action from U.S. Appl. No. 16/718,954, dated Sep. 23, 2021, 9 pages.
Notice of Reason for Refusal for Japanese Application No. 2020515128 dated Jun. 7, 2021, 13 pages.
Communication Pursuant to Article 94(3) EPC for European Application No. 18762994.4 dated Aug. 4, 2021, 10 pages.
Notice of Reasons for Refusal for Japanese Application No. 2020-515128, dated Feb. 10, 2022, 10 pages.
Summons to Attend Oral Proceedings Pursuant to Rule 115(1) EPC for European application No. 17844645.6, dated Feb. 1, 2022, 7 pages.
Final Office Action from U.S. Appl. No. 16/718,954, dated May 13, 2022, 8 pages.
Summons to Attend Oral Proceedings Pursuant to Rule 115(1) EPC for European Application No. 17844608.4 dated Apr. 12, 2022, 8 pages.
Communication Pursuant to Article 94(3) EPC for European Application No. 18762994.4 dated Jun. 9, 2022, 14 pages.
Brief Communication of Oral Proceedings for European Application No. 17844645.6, dated Jun. 15, 2022, 9 pages.
Decision to refuse European U.S. Appl. No. 16/718,954 dated Jun. 29, 2022, 12 pages.
Notice of Allowance from U.S. Appl. No. 16/718,954, dated Jul. 11, 2022, 9 pages.
Notice of Allowance from U.S. Appl. No. 16/718,954, dated Jul. 25, 2022, 2 pages.

* cited by examiner

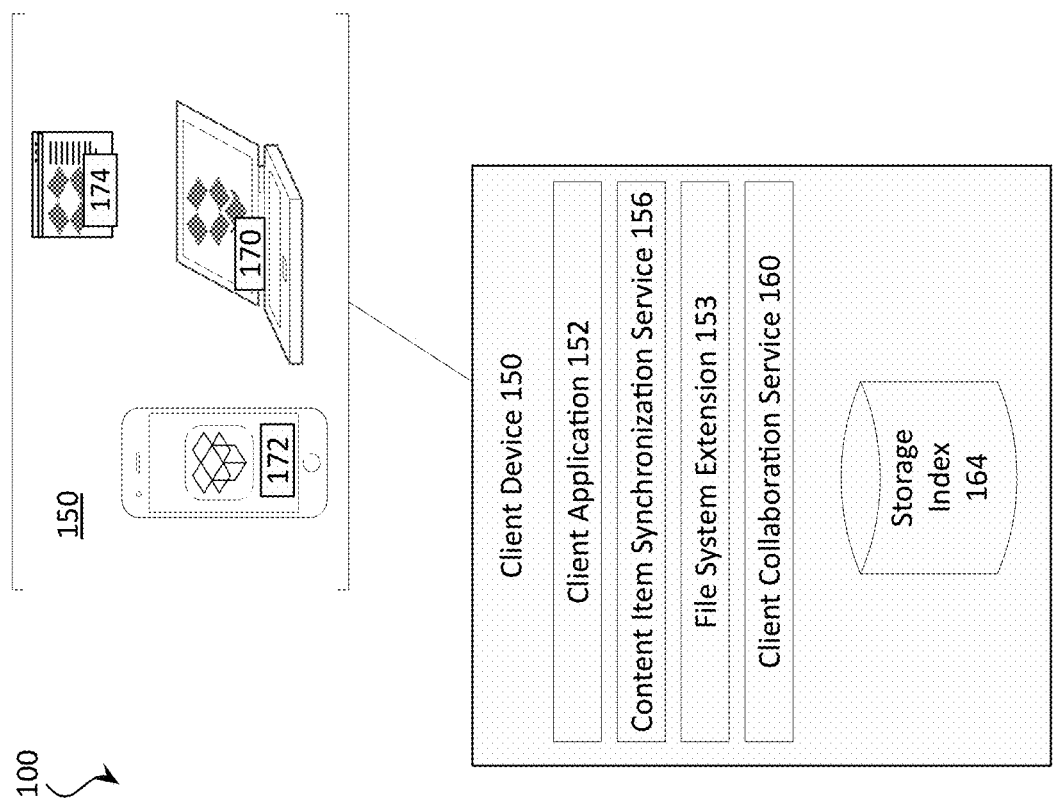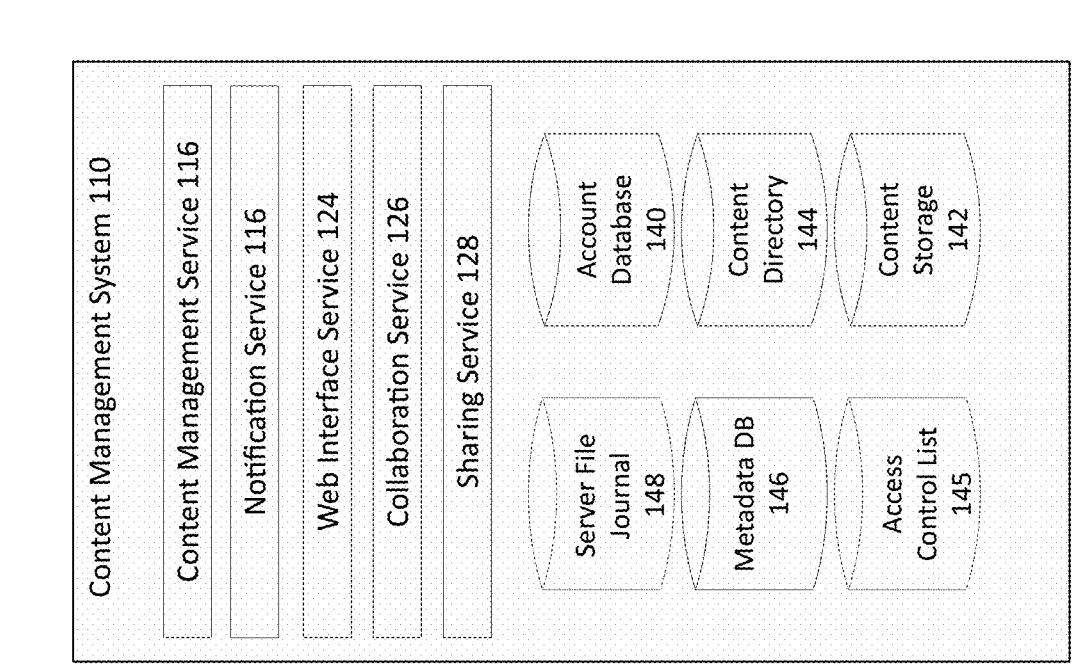
FIG. 1

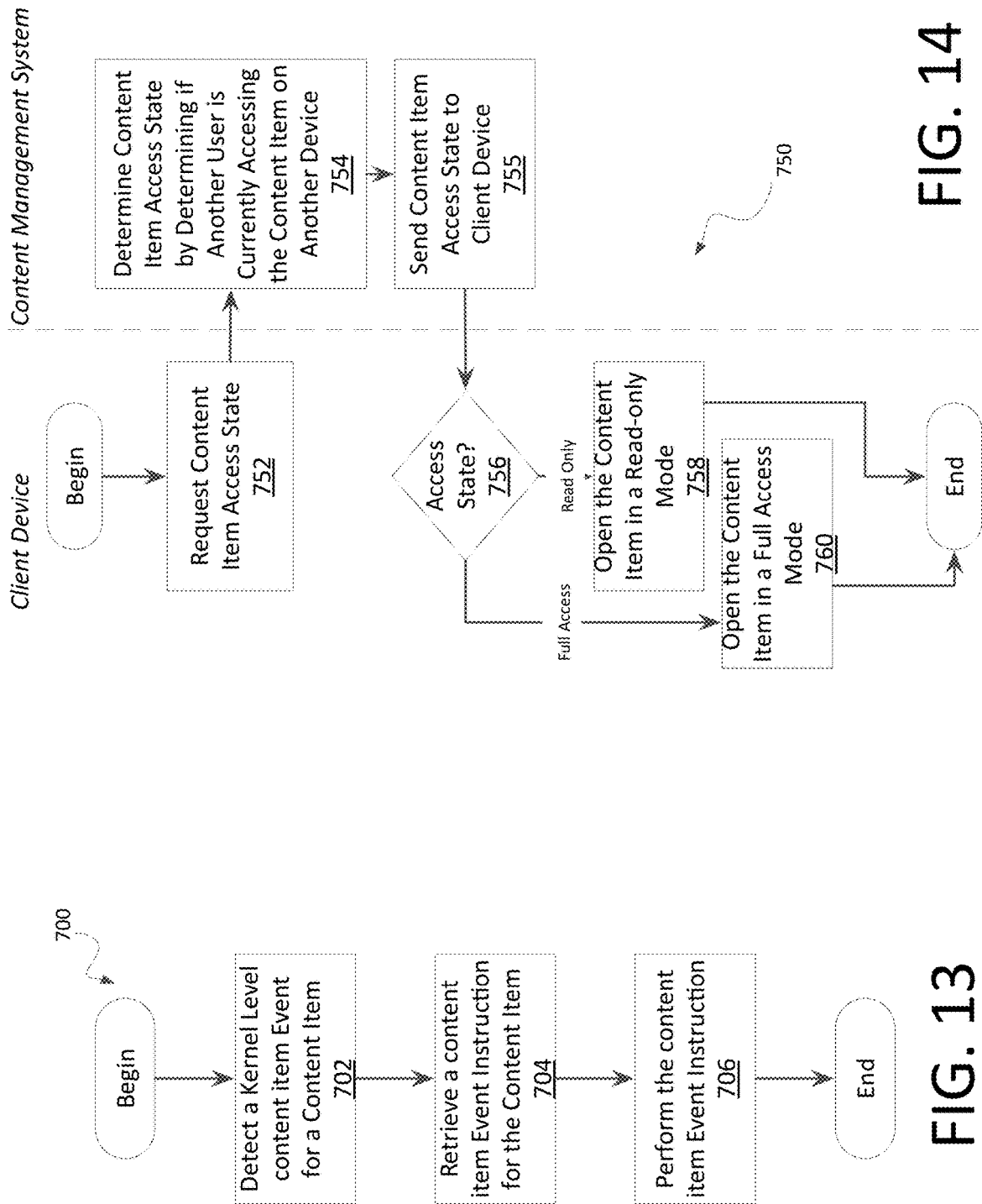

WORKFLOW FUNCTIONS OF CONTENT MANAGEMENT SYSTEM ENFORCED BY CLIENT DEVICE

CROSS-REFERENCE TO RELATED APPLICATIONS

This application is a continuation of U.S. application Ser. No. 16/182,040, filed on Nov. 6, 2018, which is a continuation of U.S. application Ser. No. 15/785,178, filed on Oct. 16, 2017, now U.S. Pat. No. 10,331,623 and U.S. application Ser. No. 15/785,216, filed on Oct. 16, 2017, now U.S. Pat. No. 10,140,467, all of which are expressly incorporated by reference herein in their entireties.

BACKGROUND

Many content management systems provide a file check-in and checkout functionality. This functionality is heavily used amongst teams that share access to certain files to avoid redundant work and conflicted copies of files. While the feature is useful, use of this feature has traditionally required extra steps in a user's workflow. For example, systems offering this feature typically require files to be stored on a server where users can retrieve them. This can be viewed as an inconvenience especially in view of recent technologies that can synchronize files amongst client devices and servers so that each device has an updated copy. Checking-in a file can be a further inconvenience, as this can require navigating to the server and affirmatively checking-in in the file. Often times users forget to affirmatively check-in the file, which can impair the ability of others to work on the file because the file remains locked out even after the user has completed their edits. In fact, current systems that offer check-in and check-out functionality are inconvenient enough that some users work outside of the content management system and only check files in when they are done with the project. Such behaviors eliminate benefits of sharing files and working collaboratively. Accordingly there is a need to improve the user experience related to file check-in and checkout functionality.

BRIEF DESCRIPTION OF THE DRAWINGS

The above-recited and other advantages and features of the disclosure will become apparent by reference to specific embodiments thereof which are illustrated in the appended drawings. Understanding that these drawings depict only example embodiments of the disclosure and are not therefore to be considered to be limiting of its scope, the principles herein are described and explained with additional specificity and detail through the use of the accompanying drawings in which:

FIG. 1 illustrates an example configuration of devices and a network in accordance with some embodiments;

FIG. 13 illustrates an example method for detecting a kernel level file event in accordance with some embodiments;

FIG. 14 illustrates an example method for adapting the presentation of a content item in accordance with some embodiments.

DETAILED DESCRIPTION

Figure 2:
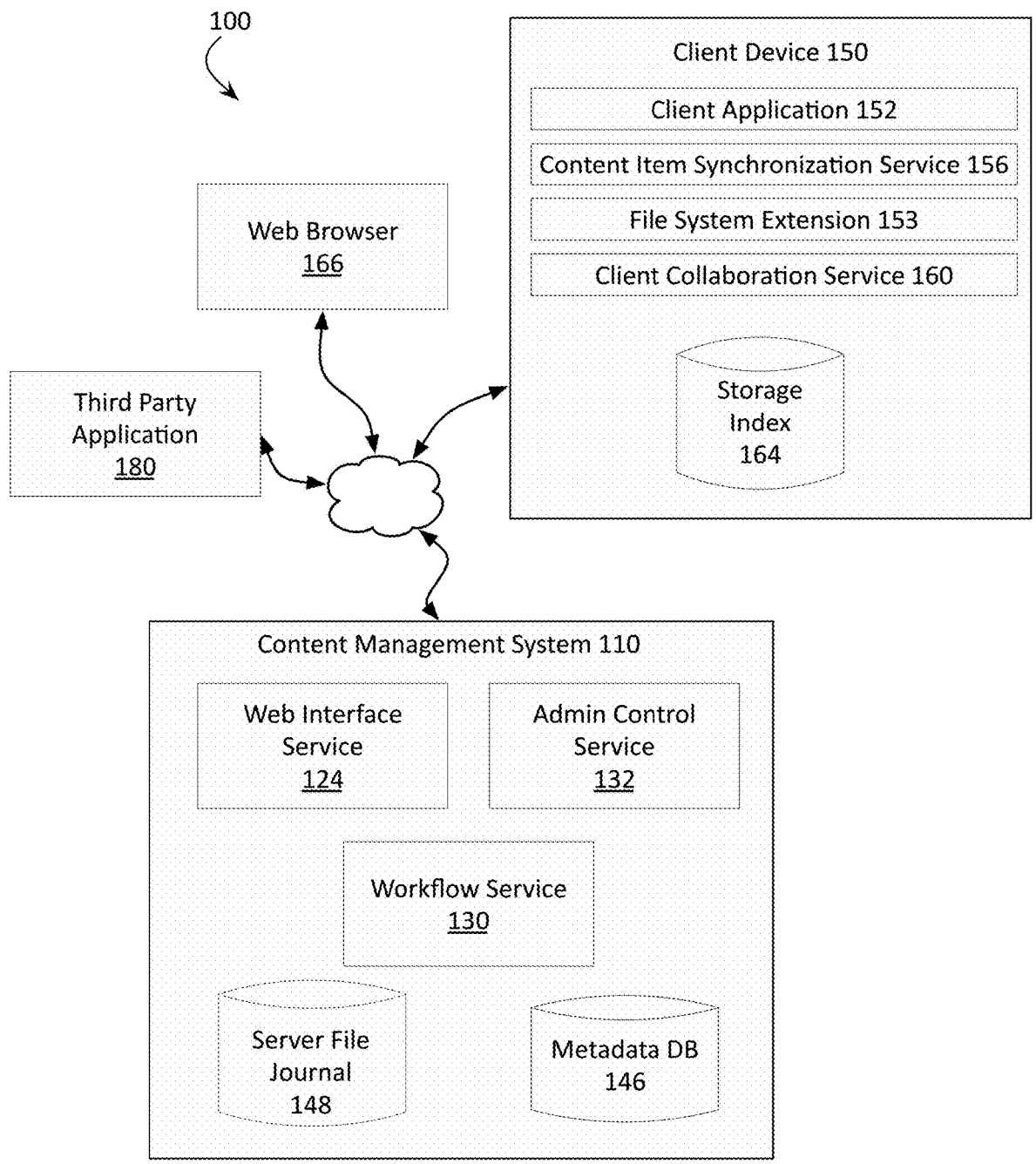
FIG. 2 illustrates an example configuration of devices and a network in accordance with some workflow service embodiments.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

The disclosed technology addresses the need in the art for providing workflow controls for shared content items stored on client devices, and enforcing content item check outs or content item locks for shared content items stored and accessed on client devices. The present technology further includes automatically locking a shared content item that is edited on a client device so that other team members cannot modify the file. Accordingly, the present technology improves upon existing systems that provide workflow controls such as file check-in and checkout functionality by permitting users to access files directly from the file system of their client device, and by providing automatic checkout and check-in functionality.

In some embodiments the disclosed technology is deployed in the context of a content management system having content item synchronization capabilities and collaboration features, among others. An example system configuration 100 is shown in FIG. 1, which depicts content management system 110 interacting with client device 150.

Accounts

Content management system 110 can store content items in association with accounts, as well as perform a variety of content item management tasks, such as retrieve, modify, browse, and/or share the content item(s). Furthermore, content management system 110 can enable an account to access content item(s) from multiple client devices.

Content management system 110 supports a plurality of accounts. An entity (user, group of users, company, etc.) can create an account with content management system, and account details can be stored in account database 140. Account database 140 can store profile information for registered entities. In some cases, profile information for registered entities includes a username and/or email address. Account database 140 can include account management information, such as account type (e.g. various tiers of free or paid accounts), storage space allocated, storage space used, client devices 150 having a registered content management client application 152 resident thereon, security settings, personal configuration settings, etc.

Account database 140 can store groups of accounts associated with an entity. Groups can have permissions based on group policies and/or access control lists, and members of the groups can inherit the permissions. For example, a marketing group can have access to one set of content items while an engineering group can have access to another set of content items. An administrator group can modify groups, modify user accounts, etc.

Content Item Storage

A feature of content management system 110 is the storage of content items, which can be stored in content storage 142. Content items can be any digital data such as documents, collaboration content items, text files, audio files, image files, video files, webpages, executable files, binary files, etc. A content item can also include collections or other mechanisms for grouping content items together with different behaviors, such as folders, zip files, playlists, albums, etc. A collection can refer to a folder, or a plurality of content items that are related or grouped by a common attribute. In some embodiments, content storage 142 is combined with other types of storage or databases to handle specific functions. Content storage 142 can store content items, while metadata regarding the content items can be stored in metadata database 146. Likewise, data regarding where a content item is stored in content storage 142 can be stored in content directory 144. Additionally, data regarding changes, access, etc. can be stored in server file journal 148. Each of the various storages/databases such as content storage 142, content directory 144, server file journal 148, and metadata database 146 can be comprised of more than one such storage or database and can be distributed over many devices and locations. Other configurations are also possible. For example, data from content storage 142, content directory 144, server file journal 148, and/or metadata database 146 may be combined into one or more content storages or databases or further segmented into additional content storages or databases. Thus, content management system 110 may include more or less storages and/or databases than shown in FIG. 1.

In some embodiments, content storage 142 is associated with at least one content management service 116, which includes software or other processor executable instructions for managing the storage of content items including, but not limited to, receiving content items for storage, preparing content items for storage, selecting a storage location for the content item, retrieving content items from storage, etc. In some embodiments, content management service 116 can divide a content item into smaller chunks for storage at content storage 142. The location of each chunk making up a content item can be recorded in content directory 144. Content directory 144 can include a content entry for each content item stored in content storage 142. The content entry can be associated with a unique ID, which identifies a content item.

In some embodiments, the unique ID, which identifies a content item in content directory 144, can be derived from a deterministic hash function. This method of deriving a unique ID for a content item can ensure that content item duplicates are recognized as such since the deterministic hash function will output the same identifier for every copy of the same content item, but will output a different identifier for a different content item. Using this methodology, content management service 116 can output a unique ID for each content item.

Content management service 116 can also designate or record a content path for a content item. The content path can include the name of the content item and/or folder hierarchy associated with the content item. For example, the content path can include a folder or path of folders in which the content item is stored in a local file system on a client device. Content management service 116 can use the content path to present the content items in the appropriate folder hierarchy, such as a tree-like directory structure. While content items are stored in content storage 142 in blocks and may not be stored under a tree like directory structure, such directory structure is a comfortable navigation structure for users. Content management service 116 can define or record a content path for a content item wherein the "root" node of a directory structure can be a namespace for each account. Within the namespace can be a directory structure defined by a user of an account and/or content management service 116. Content directory 144 can store the content path for each content item as part of a content entry.

In some embodiments the namespace can include additional namespaces that appear in the directory structure as if they are stored within the root node. This can occur when an account has access to a shared collection. Shared collections can be assigned their own namespace within content management system 110. While shared collections are actually a root node for the shared collection, they are located subordinate to the user account namespace in the directory structure, and can appear as a folder within a folder for the user account. As addressed above, the directory structure is merely a comfortable navigation structure for users, but does not correlate to storage locations of content items in content storage 142.

While the directory structure in which an account views content items does not correlate to storage locations at content management system 110, the directory structure can correlate to storage locations on client device 150 depending on the file system used by client device 150.

As addressed above, a content entry in content directory 144 can also include the location of each chunk making up a content item. More specifically, the content entry can include content pointers that identify the location in content storage 142 of the chunks that make up the content item.

In addition to a content path and content pointer, a content entry in content directory 144 can also include a user account identifier that identifies the user account that has access to the content item and/or a group identifier that identifies a group with access to the content item. In some embodiments, multiple user account identifiers can be associated with a single content entry indicating that the content item has shared access by the multiple user accounts. In some embodiments, user account identifiers associated with a single content entry can specify different permissions for the associated content item. In some embodiments, content directory 144 can describe a hierarchical structure of content items associated with a user account, the hierarchical structure being specific to the user account.

Content management service 116 can decrease the amount of storage space required by identifying duplicate content items or duplicate blocks that make up a content item or versions of a content item. Instead of storing multiple copies, content storage 142 can store a single copy of the content item or block of the content item and content directory 144 can include a pointer or other mechanism to link the duplicates to the single copy.

Content management service 116 can also store metadata describing content items, content item types, folders, file path, and/or the relationship of content items to various accounts, collections, or groups in metadata database 146, in association with the unique ID of the content item.

Content management service 116 can also store a log of data regarding changes, access, etc. in server file journal 148. Server file journal 148 can include the unique ID of the content item and a description of the change or access action along with a time stamp or version number and any other relevant data. Server file journal 148 can also include pointers to blocks affected by the change or content item access. Content management service can provide the ability to undo operations, by using a content item version control that tracks changes to content items, different versions of content items (including diverging version trees), and a change history that can be acquired from the server file journal 148. The change history can include a set of changes that, when applied to the original content item version, produce the changed content item version.

Content Item Synchronization

Another feature of content management system 110 is synchronization of content items with at least one client device 150. Client device(s) can take different forms and have different capabilities. For example, client device 170 is a computing device having a local file system accessible by multiple applications resident thereon. Client device 172 is a computing device wherein content items are only accessible to a specific application or by permission given by the specific application, and the content items are stored either in an application specific space or in the cloud. Client device 174 is any client device accessing content management system 110 via a web browser and accessing content items via a web interface. While example client devices 170, 172, and 174 are depicted in form factors such as a laptop, mobile device, or web browser, it should be understood that the descriptions thereof are not limited to devices of these example form factors. For example a mobile device such as client 172 might have a local file system accessible by multiple applications resident thereon, or client 172 might access content management system 110 via a web browser. As such, the form factor should not be considered limiting when considering client 150's capabilities. One or more functions described herein with respect to client device 150 may or may not be available on every client device depending on the specific capabilities of the device—the file access model being one such capability.

In many embodiments, client devices are associated with an account of content management system 110, but in some embodiments client devices can access content using shared links and do not require an account.

As noted above, some client devices can access content management system 110 using a web browser. However, client devices can also access content management system 110 using client application 152 stored and running on client device 150. Client application 152 can include a content item synchronization service 156.

Content item synchronization service 156 can be in communication with content management service 116 to synchronize changes to content items between client device 150 and content management system 110.

Client device 150 can synchronize content with content management system 110 via content synchronization service 156. The synchronization can be platform agnostic. That is, content can be synchronized across multiple client devices of varying type, capabilities, operating systems, etc. Content synchronization service 156 can synchronize any changes (new, deleted, modified, copied, or moved content items) to content items in a designated location of a file system of client device 150.

Content items can be synchronized from client device 150 to content management system 110, and vice versa. In embodiments wherein synchronization is from client device 150 to content management system 110, a user can manipulate content items directly from the file system of client device 150, while file system extension 153 (which can be integrated with the local file system, or even the operating system kernel) can intercept read, write, copy, move, delete commands relative to content items in the designated location of the file system of client device 150.

When file system extension 153 notices a write, move, copy, or delete command, it can notify content item synchronization service 156, which can synchronize the changes to content management system service 116. In some embodiments, content item synchronization service 156 can perform some functions of content management system service 116 including functions addressed above such as dividing the content item into blocks, hashing the content item to generate a unique identifier, etc. Content synchronization service 156 can index content within client storage index 164 and save the result in storage index 164. Indexing can include creating a unique identifier for each content item. In some embodiments, content synchronization service 156 creates this unique identifier by putting the data of the content item (e.g., excluding the filename and/or other metadata) through a hash function; as addressed above, content management system can use a similar process to provide identifiers to content on content management system 110. Content synchronization service 156 can use storage index 164 to facilitate the synchronization of at least a portion of the content within client storage with content associated with a user account on content management system 110. For example, content synchronization service 156 can compare storage index 164 with content management system 110 and detect differences between content on client storage and content associated with a user account on content management system 110. Content synchronization service 156 can then attempt to reconcile differences by uploading, downloading, modifying, and deleting content on client storage as appropriate. Content management service 116 can store the changed or new block for the content item and update server file journal 148, metadata database 146, content directory 144, content storage 142, account database 140, etc. as appropriate.

When synchronizing from content management system 110 to client device 150, a modification, addition, deletion, move of a content item recorded in server file journal 148 can trigger a notification to be sent to client device 150 using notification service 116. When client device 150 is informed of the change to server file journal 148, client device can check storage index 164 to determine if the time stamp of the change occurred since the last synchronization, or determine if the specific change has been synchronized. When client device 150 determines that it is out of synchronization with content management system 110, content item synchronization service 156 requests content item blocks including the changes, and updates its local copy of the changed content items. In some embodiments, notification service can query other services or databases of content management system 110 such as server file journal 148 to gain more context for the notification, to determine if a notification can be batched with another notification or to supplement a notification Sometimes client device 150 might not have a network connection available. In this scenario, content item synchronization service 156 can monitor the linked collection for content item changes and queue those changes for later synchronization to content management system 110 when a network connection is available. Similarly, a user can manually start, stop, pause, or resume synchronization with content management system 110.

Content item synchronization service 156 can synchronize all content associated with a particular user account on content management system 110. Alternatively, content item synchronization service 156 can selectively synchronize a portion of the content of the total content associated with the particular user account on content management system 110. Selectively synchronizing only a portion of the content can preserve space on client device 150 and save bandwidth.

In some embodiments, content item synchronization service 156 selectively stores a portion of the content associated with the particular user account and stores placeholder content items in client storage for the remainder portion of the content. For example, content item synchronization service 156 can store a placeholder content item that has the same filename, path, extension, metadata, of its respective complete content item on content management system 110, but lacking the data of the complete content item. The placeholder content item can be a few kilobytes or less in size while the respective complete content item might be significantly larger. After client device 150 attempts to access the content item, content item synchronization service 156 can retrieve the data of the content item from content management system 110 and provide the complete content item to accessing client device 150. This approach can provide significant space and bandwidth savings while still providing full access to a user's content on content management system 110.

Collaboration Features

Another feature of content management system 110 is to facilitate collaboration between users. Collaboration features include content item sharing, commenting on content items, co-working on content items, instant messaging, providing presence and seen state information regarding content items, etc.

Sharing

Content management system 110 can manage sharing content via sharing service 128. Sharing content by providing a link to the content can include making the content item accessible from any computing device in network communication with content management system 110. However, in some embodiments a link can be associated with access restrictions enforced by content management system 110. Sharing content can also include linking content using sharing service 128 to share content within content management system 110 with at least one additional user account (in addition to the original user account associated with the content item) so that each user account has access to the content item. The additional user account can gain access to the content by accepting the content, which will then be accessible through either web interface service 124 or directly from within the directory structure associated with their account on client device 150. The sharing can be performed in a platform agnostic manner. That is, the content can be shared across multiple client devices 150 of varying type, capabilities, operating systems, etc. The content can also be shared across varying types of user accounts.

To share a content item within content management system 110 sharing service 128 can add a user account identifier to a content entry in access control list database 145 associated with the content item, thus granting the added user account access to the content item. Sharing service 128 can also remove user account identifiers from a content entry to restrict a user account's access to the content item. Sharing service 128 can record content item identifiers, user account identifiers given access to a content item, and access levels in access control list database 145.

To share content items outside of content management system 110, sharing service 128 can generate a custom network address, such as a uniform resource locator (URL), which allows any web browser to access the content item or collection in content management system 110 without any authentication. To accomplish this, sharing service 128 can include content identification data in the generated URL, which can later be used to properly identify and return the requested content item. For example, sharing service 128 can include the account identifier and the content path or a content item identifying code in the generated URL. Upon selection of the URL, the content identification data included in the URL can be transmitted to content management system 110, which can use the received content identification data to identify the appropriate content item and return the content item.

In addition to generating the URL, sharing service 128 can also be configured to record in access control list database 145 that a URL to the content item has been created. In some embodiments, the content entry associated with a content item can include a URL flag indicating whether a URL to the content item has been created. For example, the URL flag can be a Boolean value initially set to 0 or false to indicate that a URL to the content item has not been created. Sharing service 128 can change the value of the flag to 1 or true after generating a URL to the content item.

In some embodiments, sharing service 128 can associate a set of permissions to a URL for a content item. For example, if a user attempts to access the content item via the URL, sharing service 128 can provide a limited set of permissions for the content item. Examples of limited permissions include restrictions that the user cannot download the content item, save the content item, copy the content item, modify the content item, etc. In some embodiments, limited permissions include restrictions that only permit a content item to be accessed from with a specified domain, i.e., from within a corporate network domain, or by accounts associated with a specified domain, e.g., accounts associated with a company account (e.g., @acme.com).

In some embodiments, sharing service 128 can also be configured to deactivate a generated URL. For example, each content entry can also include a URL active flag indicating whether the content should be returned in response to a request from the generated URL. For example, sharing service 128 can only return a content item requested by a generated link if the URL active flag is set to 1 or true. Thus, access to a content item for which a URL has been generated can be easily restricted by changing the value of the URL active flag. This allows a user to restrict access to the shared content item without having to move the content item or delete the generated URL. Likewise, sharing service 128 can reactivate the URL by again changing the value of the URL active flag to 1 or true. A user can thus easily restore access to the content item without the need to generate a new URL.

In some embodiments, content management system 110 can designate a URL for uploading a content item. For example, a first user with a user account can request such a URL, provide the URL to a contributing user and the contributing user can upload a content item to the first user's user account using the URL.

Presence and Seen State

In some embodiments, content management system can provide information about how users with which a content item is shared are interacting or have interacted with the content item. In some embodiments, content management system 110 can report that a user with which a content item is shared is currently viewing the content item. For example, client collaboration service 160 can notify notifications service 117 when client device 150 is accessing the content item. Notifications service 117 can then notify all client devices of other users having access to the same content item of the presence of the user of client device 150 with respect to the content item.

In some embodiments, content management system 110 can report a history of user interaction with a shared content item. Collaboration service 126 can query data sources such as metadata database 146 and server file journal 148 to determine that a user has saved the content item, that a user has yet to view the content item, etc., and disseminate this status information using notification service 117 to other users so that they can know who currently is or has viewed or modified the content item.

Collaboration service 126 can facilitate comments associated with content, even if a content item does not natively support commenting functionality. Such comments can be stored in metadata database 146.

Collaboration service 126 can originate and transmit notifications for users. For example, a user can mention another user in a comment and collaboration service 126 can send a notification to that user that he has been mentioned in the comment. Various other content item events can trigger notifications, including deleting a content item, sharing a content item, etc.

Collaboration service 126 can provide a messaging platform whereby users can send and receive instant messages, voice calls, emails, etc.

Collaboration Content Items

Collaboration service 126 can also provide an interactive content item collaboration platform whereby users can simultaneously create collaboration content items, comment in the collaboration content items, and manage tasks within the collaboration content items. Collaboration content items can be files that users can create and edit using a collaboration content item editor, and can contain collaboration content item elements. Collaboration content item elements may include a collaboration content item identifier, one or more author identifiers, collaboration content item text, collaboration content item attributes, interaction information, comments, sharing users, etc. Collaboration content item elements can be stored as database entities, which allows for searching and retrieving the collaboration content items. Multiple users may access, view, edit, and collaborate on collaboration content items at the same time or at different times. In some embodiments this can be managed by requiring two users access a content item through a web interface and there they can work on the same copy of the content item at the same time.

Collaboration Companion Interface

In some embodiments client collaboration service 160 can provide a native application companion interface for the purpose of displaying information relevant to a content item being presented on client device 150. In embodiments wherein a content item is accessed by a native application stored and executed on client device 150, where the content item is in a designated location of the file system of client device 150 such that the content item is managed by content application 152, the native application may not provide any native way to display the above addressed collaboration data. In such embodiments, client collaboration service 160 can detect that a user has opened a content item, and can provide an overlay with additional information for the content item, such as collaboration data. For example, the additional information can include comments for the content item, status of the content item, activity of other users previously or currently viewing the content item. Such an overlay can warn a user that changes might be lost because another user is currently editing the content item.

In some embodiments, one or more of the services or storages/databases discussed above can be accessed using public or private application programming interfaces.

Certain software applications can access content storage 142 via an API on behalf of a user. For example, a software package such as an application running on client device 150, can programmatically make API calls directly to content management system 110 when a user provides authentication credentials, to read, write, create, delete, share, or otherwise manipulate content.

A user can view or manipulate content stored in a user account via a web interface generated and served by web interface service 124. For example, the user can navigate in a web browser to a web address provided by content management system 110. Changes or updates to content in the content storage 142 made through the web interface, such as uploading a new version of a content item, can be propagated back to other client devices associated with the user's account. For example, multiple client devices, each with their own client software, can be associated with a single account and content items in the account can be synchronized between each of the multiple client devices.

Client device 150 can connect to content management system 110 on behalf of a user. A user can directly interact with client device 150, for example when client device 150 is a desktop or laptop computer, phone, television, internet-of-things device, etc. Alternatively or additionally, client device 150 can act on behalf of the user without the user having physical access to client device 150, for example when client device 150 is a server.

Some features of client device 150 are enabled by an application installed on client device 150. In some embodiments, the application can include a content management system specific component. For example, the content management system specific component can be a stand-alone application 152, one or more application plug-ins, and/or a browser extension. However, the user can also interact with content management system 110 via a third-party application, such as a web browser, that resides on client device 150 and is configured to communicate with content management system 110. In various implementations, the client-side application 152 can present a user interface (UI) for a user to interact with content management system 110. For example, the user can interact with the content management system 110 via file system extension 153 integrated with the file system or via a webpage displayed using a web browser application.

In some embodiments, client application 152 can be configured to manage and synchronize content for more than one account of content management system 110. In such embodiments client application 152 can remain logged into multiple accounts and provide normal services for the multiple accounts. In some embodiments, each account can appear as folder in a file system, and all content items within that folder can be synchronized with content management system 110. In some embodiments, client application 152 can include a selector to choose one of the multiple accounts to be the primary account or default account.

While content management system 110 is presented with specific components, it should be understood by one skilled in the art, that the architectural configuration of system 100 is simply one possible configuration and that other configurations with more or fewer components are possible. Further, a service can have more or less functionality, even including functionality described as being with another service. Moreover, features described herein with respect to an embodiment can be combined with features described with respect to another embodiment.

While system 100 is presented with specific components, it should be understood by one skilled in the art, that the architectural configuration of system 100 is simply one possible configuration and that other configurations with more or fewer components are possible.

In some embodiments system 100 is useful for carrying out the present technology. Specifically the present technology pertains to providing workflow controls to shared content items stored on client devices, and enforcing content item check outs or content item locks for shared content items stored and accessed on client devices. The present technology further includes automatically locking a shared content item that is edited on a client device so that other team members cannot modify the content item. Accordingly, the present technology improves upon existing systems that provide workflow controls such as content item check-in and checkout functionality by permitting users to access content items directly from the file system of their client device, and by providing automatic checkout and check-in functionality, which eliminates extraneous steps from a user's workflow and makes compliance with storage and workflow policies more likely.

FIG. 2 illustrates an additional view of system 100 that illustrates some additional components useful in providing the workflow controls of the present technology. Specifically FIG. 2 illustrates workflow service 130 on content management system 110. As will be explained in greater detail below workflow service 130 provides a plurality of workflow functions to content management system 110 and interacts with server file journal 148 and metadata database 146 to record workflow statuses of individual content items.

Admin control service 132 provides functionality to an administrator to enable or disable workflow controls for content items. As will be addressed in greater detail below, client device 150 can make use of these workflow controls through content item synchronization service 156. Additionally users can make use of these workflow controls through interactions using web browser 166 and third-party application 180 which can interact with workflow service 130 via application programming interfaces (API).

Figure 3:
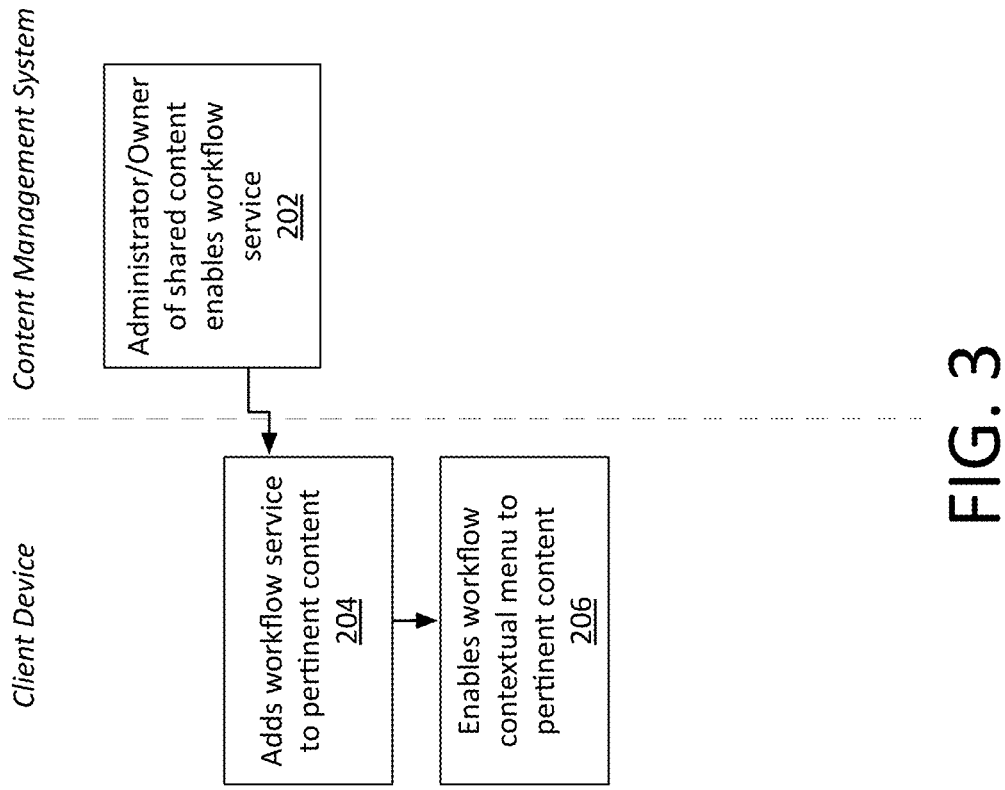
FIG. 3 illustrates an example method for enabling the workflow service in accordance with some embodiments.

FIG. 3 illustrates an example method for an administrator to enable workflow service 130 for shared content items. In some embodiments an administrator can be authorized to manage accounts and settings of a team(s), user accounts associated the team, and collections and content items accessible by the team. In some embodiments an administrator can simply be a user that has shared at least one content item.

Figure 4A:
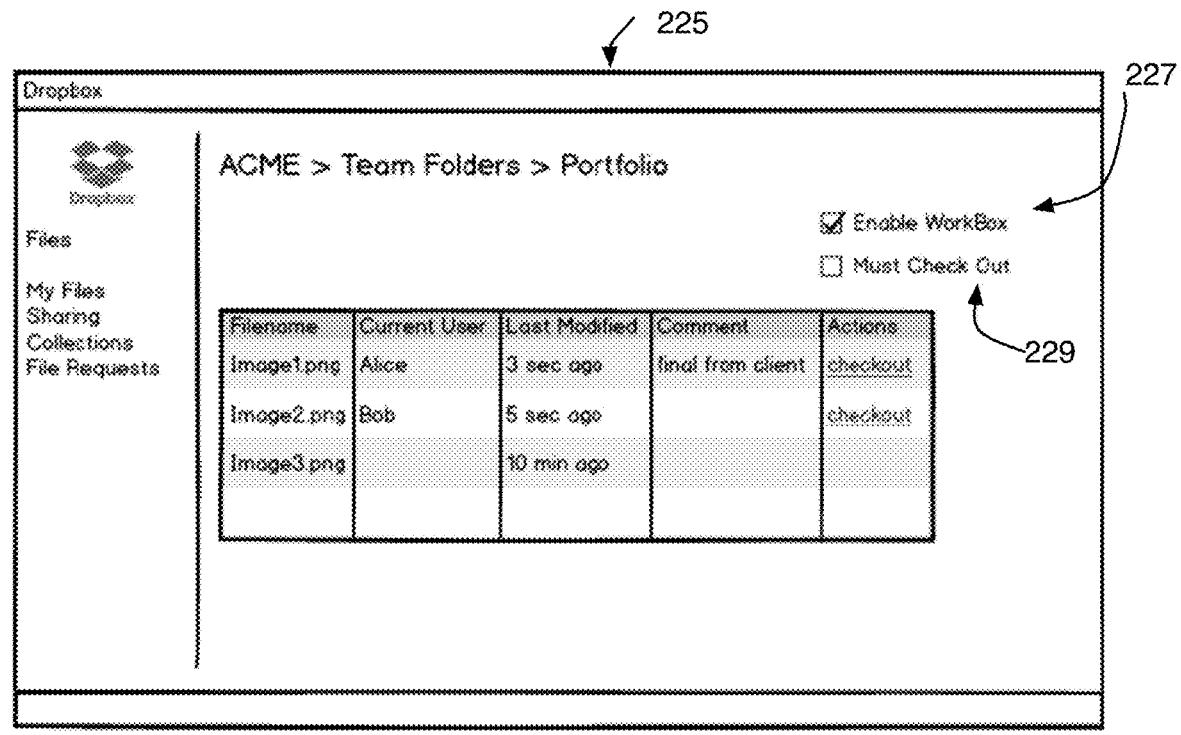
FIG. 4A and FIG. 4B illustrate example administrator screens for interacting with workflow service features in accordance with some embodiments.

The method illustrated in FIG. 3 begins when an administrator of shared content items enables (202) workflow service 130 for a collection of content items. This can be performed through an administrator user interface such as window 225 illustrated in FIG. 4A. FIG. 4A illustrates a shared collection of content items for which the administrator has selected option 227 to enable workflow service 130 for the collection of content items. In some embodiments, the administrator can require that any content item that is opened or edited in the collection must be checked out using option 229.

When an administrator of shared content items enables (202) workflow service 130 for a collection of content items, workflow service 130 can note the collection of content items as being subscribed to the workflow service in metadata database 146. Upon synchronization by content item synchronization service 156, client device 150 receives information regarding the collection of content items now subscribed to workflow service 130, and client device 150 can add (204) workflow functions to the collection of content items. As part of adding (204) workflow functions to the collection of content items, client device 150 can also enable (206) a workflow contextual menu to pertinent collections and content items. In some embodiments the contextual menu is available by "right clicking" on an icon representing a collection or a content item.

In some embodiments the collection of content items to which workflow functions are added is only a subset of the content items or collections to which a user account logged into client device 150 has access.

Figure 4B:
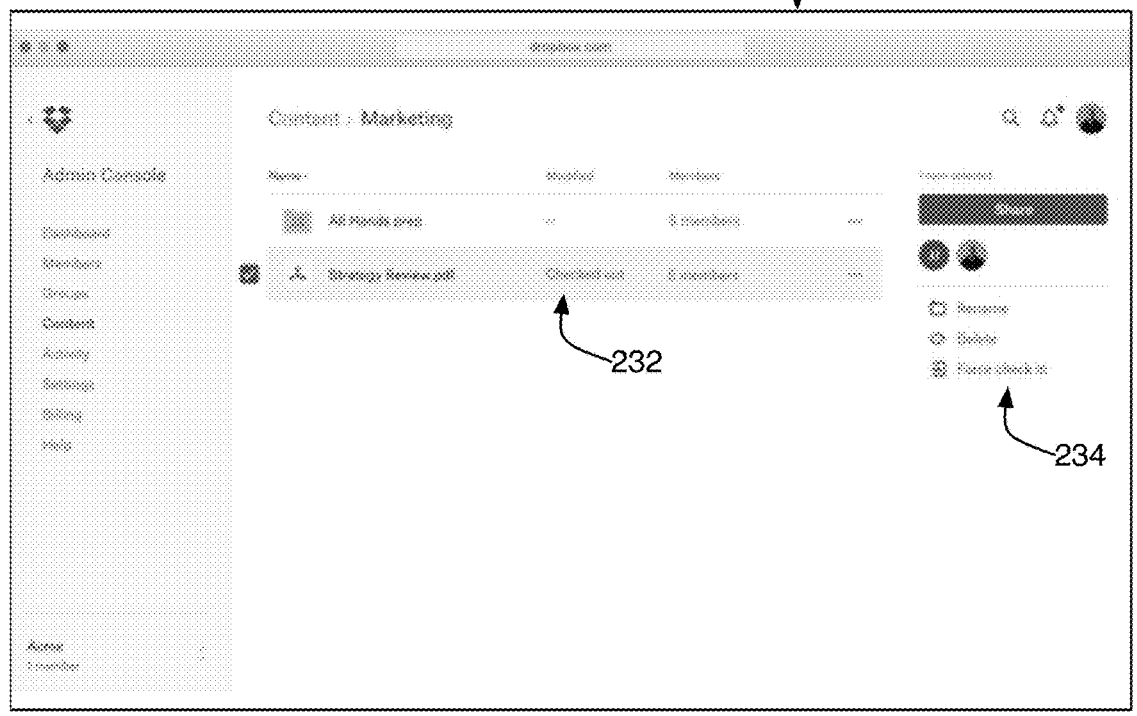

In addition to enabling and disabling workflow service 130 for a collection of content items, an administrator can also manage a workflow status of individual content items. For example FIG. 4B illustrates an administrator interface 230 for a collection or sub-collection of content items enrolled in workflow service 130. Content item "strategy review" has a status of checked out 232, which can be managed by the administrator using controls to the right of administrator interface 230. For example one such control is to force check-in 234 of a selected content item.

Figure 5:
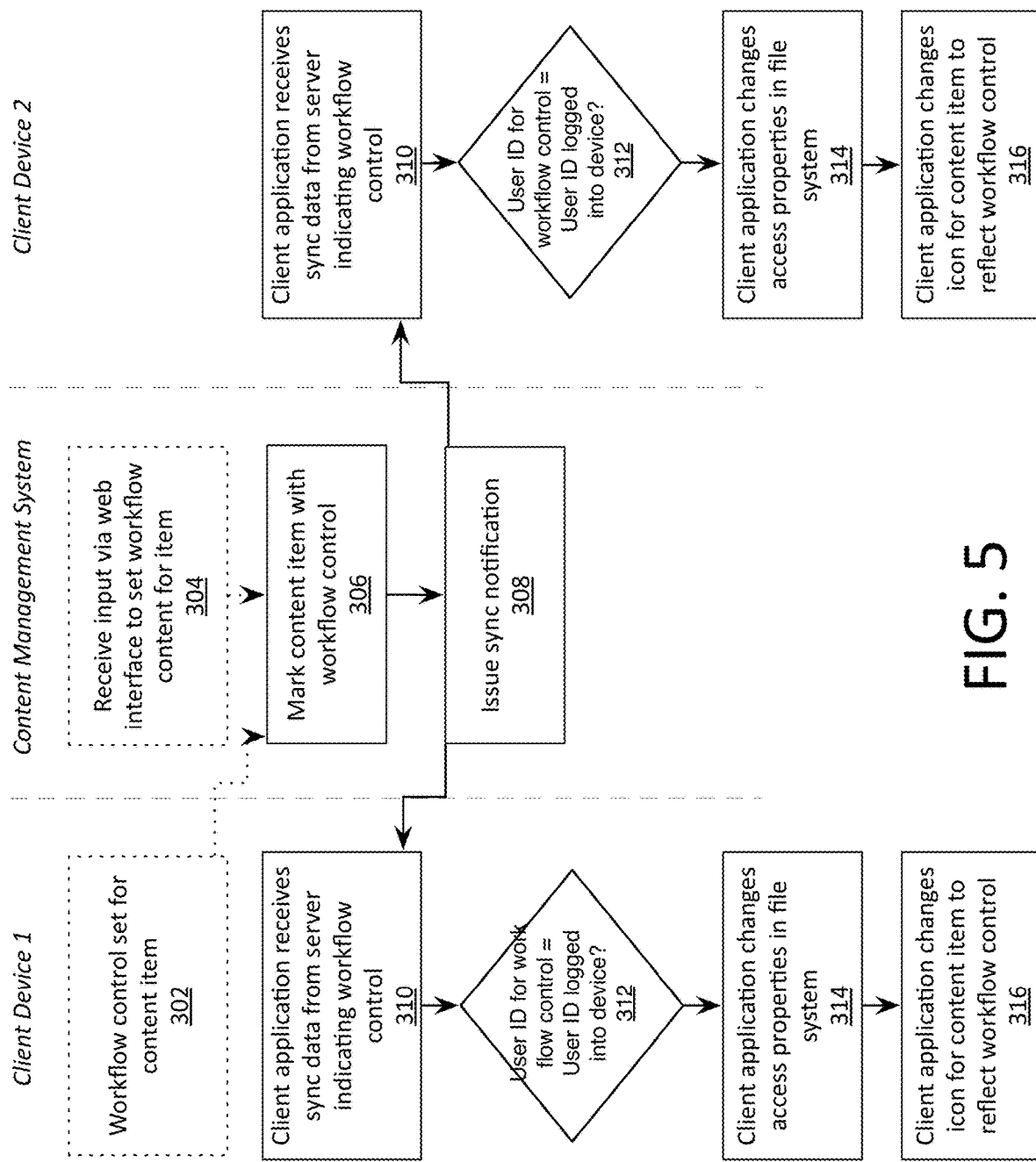
FIG. 5 illustrates an example method for setting a workflow control on a content item and synchronizing the workflow control amongst client devices and the content management system in accordance with some embodiments.

FIG. 5 illustrates enabling workflow controls by a user account for content items or collections, and further illustrates how workflow controls are propagated to client device(s) 150. In FIG. 5 certain steps are illustrated in dashed lines. These steps may or may not take place depending on the specific interactions between a user account and content management system 110.

The method illustrated in FIG. 5 begins when a workflow control is set by a user account for a content item or collection. Workflow controls can include a content item "lock" (a user account puts a lock on a content item while the content item is currently open by user account; the content item is read-only to all other user accounts), a content item "checkout" (user account puts a lock on a content item for a duration of time; the content item is read-only to all other user accounts for the duration), a content item "approval" (a workflow is established and tracked for a content item that requires a specified user account to review the content item; the content item becomes read-only for all user accounts other than the specific named user account after the content item has been marked completed); "must review" a content item (a workflow is established and tracked for a content item that requires specific user accounts or a specified number of user accounts on a team to review the content item; the content item is read-write for the entire team, at least until the requisite number of reviews has been achieved). Throughout this description any workflow control that results in making a content item read-only to at least one user may be referred to as a content item check out or a locked content item for simplicity of explanation, however, as noted above there can be some distinctions between a file lock, check out, approval, must review, etc.

A user account can set a workflow control (302) by interacting with a content item on a client device running client application 152. As will be addressed further below, the workflow control can be set automatically or manually using client device 150. The user account can also set a workflow control (304) by providing an input using web browser 166 to interact with web interface service 124 of content management system 110.

Once the user account has set the workflow control for the content item or collection, the workflow control can be communicated to server file journal 148 to add an entry (306) for the content item or collection with the workflow control. Content management system 110 can issue (308) a synchronized notification to client device(s) 150. Content item synchronization service 156 can receive (310) synchronization data from content management system server 110 indicating the workflow control for the content item(s) or collection(s).

This synchronization process can occur the same as for any other synchronization as described above wherein a change to a content item or collection on any client device or a change to a content item or collection made through interacting with a content item using web interface service 124 of content management system 110, can be synchronized amongst content management system 110 and all other devices having a user account logged-in to content management system 110 on the device that has access to the content item. In the case of synchronizing workflow controls, metadata for the content items are synchronized. In some embodiments, this metadata consists of attributes which label the content item as locked and by which owner(s), e.g., {locked_user_ID}. In some embodiments, other attributes can also be included for other workflow controls (e.g., must review, etc.). In some embodiments, the attributes can also include additional metadata regarding the workflow control such as a timestamp when the control was put into effect, and a duration. However, in some embodiments, such additional data can be stored in metadata database 146 and retrieved by client device 150 on demand.

Since the workflow control metadata for any content item is the same regardless of which user account is receiving the synchronization data, each client device 150 needs to determine appropriate access rights for each respective user account. For example each client device 150 determines (312) if the user ID in the metadata pertaining to the workflow control matches the user ID of the user account logged-in on the respective client device 150, and changes (314) access properties to the content item in the file system of the respective client device 150. Using the example of a content item lock the synchronization data can include the metadata: {locked_user_ID}. Client device 150 will determine if the user account logged into client device 150 matches the user ID in the metadata, and if it does, will mark (316) the content item as locked by the user on client device 150, but will set the access permissions to the content item as read-write, since the user account logged-in on client device 150 is the user account that has locked the content item from being edited by other user accounts. If alternatively, client device 150 determines that the user account logged-in on client device 150 is different than the user account specified in the synchronized metadata, client device 150 will mark (316) the content item as locked by another and set access permissions to read only for the content item in the file system of client device 150. Importantly the access permissions can be set within the operating system of client device 150 so that the access permissions will be enforced locally by the file system on client device 150. This provides important benefits: content items can be available even when client device 150 is not connected to content management system 110, and even if client device 150 is off-line, client device 150 file system will enforce the user accounts rights to the content item.

Figure 6:
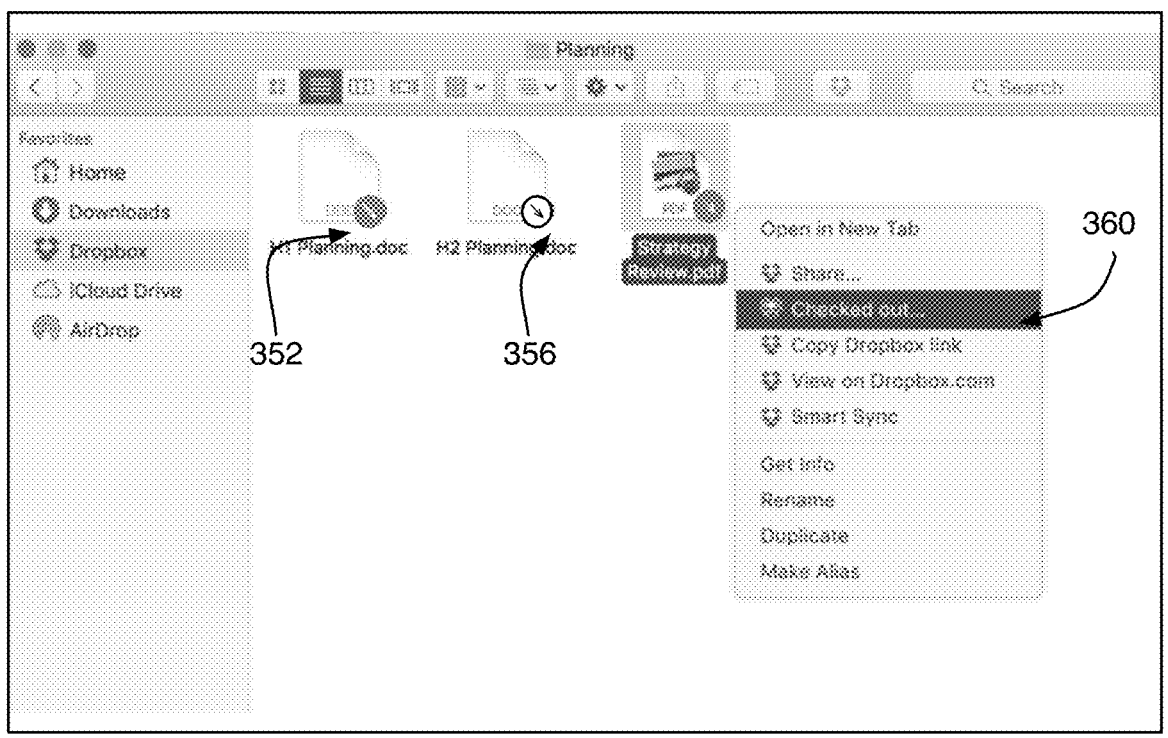
FIG. 6 illustrates an example user interface showing content items for which workflow controls have been enabled in accordance with some embodiments.

FIG. 6 illustrates example badges that can be placed on icons reflecting workflow controls applied to content items such as described with respect to step 316. In FIG. 6 icon 352 reflects that a user account other than a user account logged-in on that client device has checked out the content item. Accordingly the content item marked with icon 352 is available with read-only access. The content item marked with icon 356 reflects that the user account logged-in on the client device is the same user account that has checked out the content item, and accordingly the content item is available with read-write access privileges.

Figure 8:
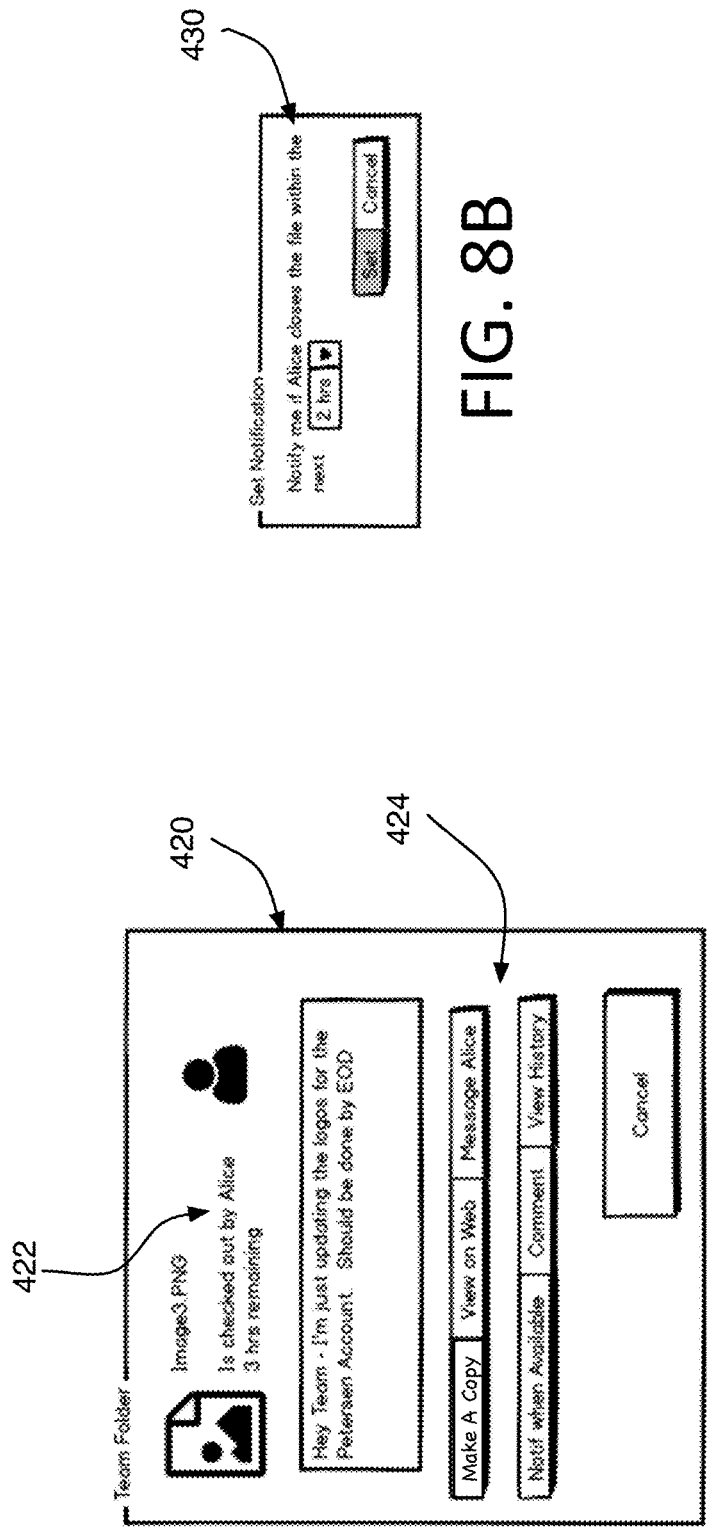
FIG. 8A and FIG. 8B illustrate example prompts regarding a checked out content item in accordance with some embodiments.
Figure 10A:
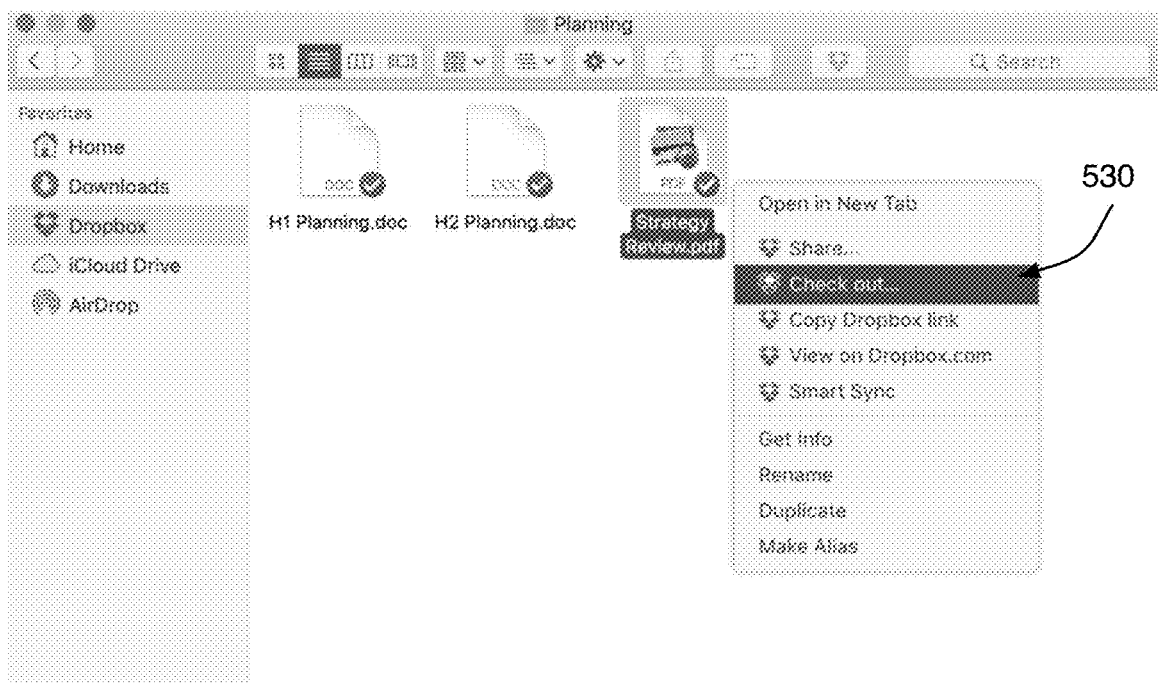
FIG. 10A and FIG. 10B illustrate example prompts regarding a check out of a content item in accordance with some embodiments.
Figure 10B:
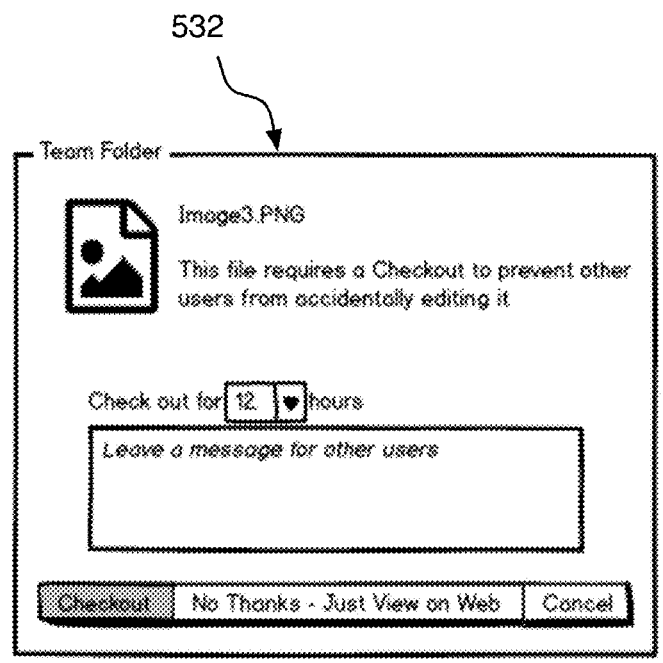

FIG. 6 additionally illustrates an example update to a contextual menu to reflect a workflow status of a content item. For example in FIG. 6 menu item 360 indicates that the content item has been checked out. Selecting menu item 360 can open one or more interfaces pertaining to the present workflow status of the content item. For example, client device 150 can display information regarding the user account that has checked out a content item, a duration of time the content item is checked out for, provide controls to check-in a content item, etc. Examples of such information displays are illustrated in FIG. 8A, FIG. 10B, and FIG. 12B.

Figure 7:
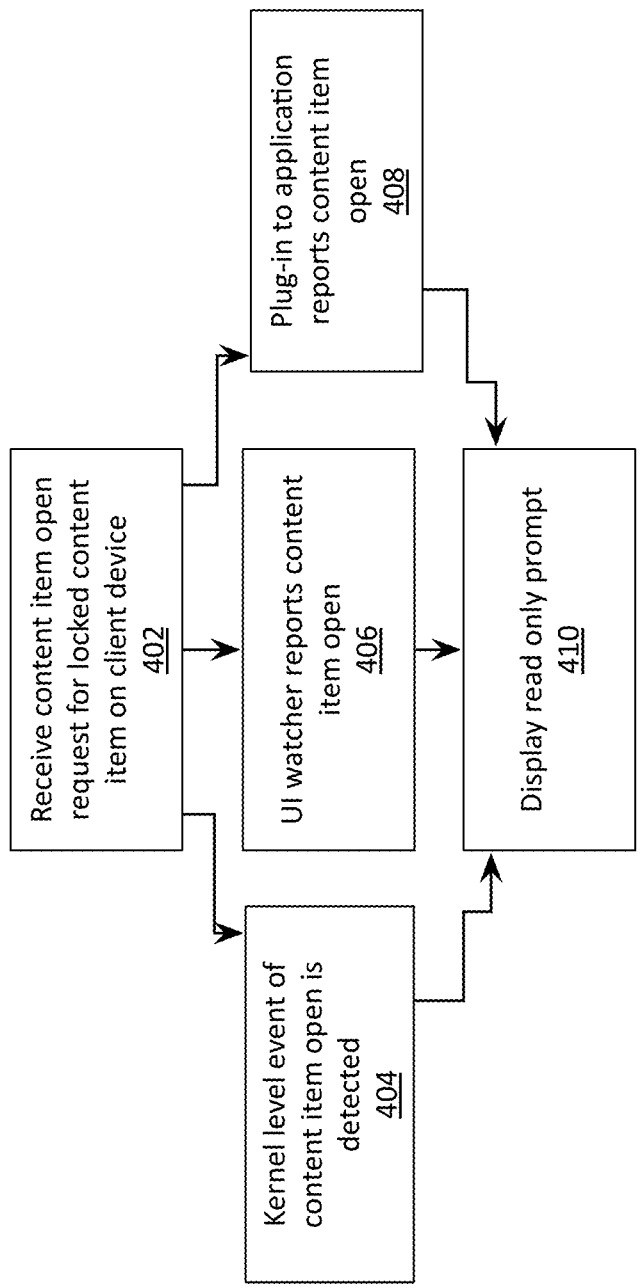
FIG. 7 illustrates an example method for enforcing workflow controls on a client device in accordance with some embodiments.

FIG. 7 illustrates an example method for enforcing content item access rights on client device 150. A limitation of known content management systems providing at least check-in and check out functionalities is that such systems enforce content item locks at the server only. Thus, in these systems content item locks are only enforced when a user attempts to access or save a content item, which requires the user to access the server for all such events. However, it is preferable to users to be able to access content items that are stored on client device 150 directly from the file system of client device 150, and as such, the present technology must enforce the workflow controls of content management system 110 on client device 150. As described above, one mechanism for enforcing workflow controls of content management system 110 on client device 150 is to change the access rights of the content items directly in the operating system of client device 150. In this regard when a user account attempts to access a content item that is read only on client device 150 operating system of client device 150 can operate as it would for any content item stored on client device 150 that is read only.

However as illustrated in FIG. 7, it is additionally desirable for client application 152 to be notified that the user account has attempted (402) to access a content item locked on client device 150 due to synchronization with content management system 110. Depending on the configuration of client device 150 and client applications 152 there are at least three options for client applications 152 to learn that the user account has attempted to access a locked content item. The first option can take place when client application 152 includes file system extension 153, which can detect or intercept operating system kernel level file events and can notify client application 152 of such events. In client devices 150 configured with file system extension 153, a kernel level event of an attempted content item open can be detected (404). However not all systems may permit file system extension 153 software and therefore in such systems where file system extension 153 is not permitted or not practical FIG. 7 illustrates two additional methods for client application 152 to learn of a content item open request. A second option is to utilize a user interface watcher. Such tools may require adjustments to accessibility options of an operating system that can be permitted by a user of client device 150. A UI watcher tool can detect windows or applications open on client device 150 and content item names and paths for those content items that are open in the applications. Such a UI watcher application can be configured to detect and report (406) that a content item under management of client application 152 is opened. A third option is to utilize a plug-in for commonly used applications to report that a content item under the management of client application 152 is open. For example applications in the productivity suites offered by MICROSOFT CORP (Microsoft Office) and APPLE INC (Apple iWork) and other commonly used applications can be configured with plug-ins provided by content management system 110. These plug-ins can report (408) whenever a content item under management of client application 152 is open. While a UI watcher or a plug-in both have the limitation that client application 152 can only learn about a content item open request after the content item has been opened, this does not present a risk that a content item that should not be edited will be edited since the default file system of client device 150 will still enforce the read-only access rights of the content item.

Upon learning that the user account has requested to open a locked content item on client device 150, client application 152 can display (410) a read only prompt 420 with additional information regarding the status of the content item. An example of prompt 420 is illustrated in FIG. 8A. Client application 152 can communicate with metadata database 146 to retrieve additional information about the workflow status of the locked content item and can populate prompt 420 that includes information 422 including that the content item was checked out by a specific user (Alice), whether there is a duration of the checkout (there are three hours remaining), and any other message that might have been provided by the user account that has checked out the content item. Prompt 420 can also provide selectable options that allow the user account to make a copy of the content item that can be edited, view the content item in a web view, message the user account that checked out the content item, receive a notification when the content item is checked back in (see FIG. 8B), comment on the content item, and view a history of revisions and workflow controls applied to the content item. FIG. 8B illustrates interface 430 that can be displayed when the user account wishes to receive a notification that the content item has been checked-in. Interface 430 includes an option to set a duration within which they would like the notification to apply.

In addition to the safeguards addressed above wherein client application 152 can change access properties for a content item in the local file system of client device 152 for a user account that has not checked out the content item, the present technology also provides server safeguards as well. Since it may be possible for a user of client device 150 to manually modify access properties of a content item from read-only to read/write, it is possible that a user might undo the file system locks set by client application 152. In such embodiments, a user could edit the content item and save the changes to the local file system. As addressed above, when a content item is modified on the client device, client application 152 typically synchronizes the changes made to the local copy of the content item with the version of the content item at content management system 110.

In some embodiments, client application 152 can recognize that the content item bearing changes is a locked file, or content management system 110 can determine that the content item is checked out by a different user account. When it is determined that a locked content item is attempting to by synchronized, client application 152 will either decline to synchronize the content item, or content management system 110 will not accept the new version of the content item. Additionally, content management system 110 can create a new content item that contains the changes and save that the new content item to content management system 110 and synchronize the new content item to client device 150. Additionally, content management system 110 can synchronize the locked content item back to client device 150 and set the content item as read only in the local file system of client device 150.

In this way, the read-only or locked status of the content item is preserved. All users end up with the same version of the content item, and any changes that were attempted by the user that bypassed the read-only properties are also preserved, but in a copy of the content item.

Figure 9:
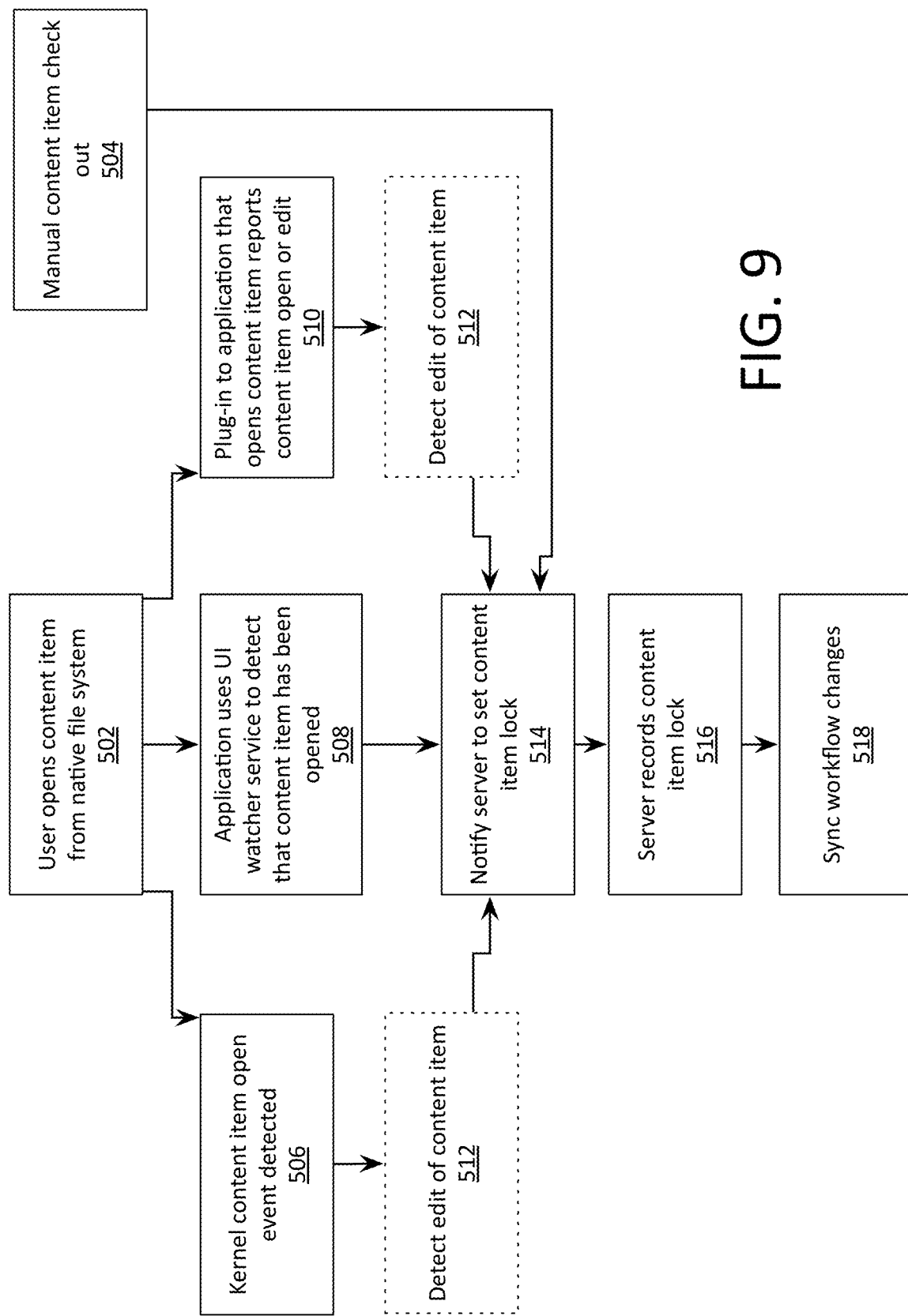
FIG. 9 illustrates an example method for automatically checking out a content item in accordance with some embodiments.

FIG. 9 illustrates an example method of a check out of a content item by a user account. In FIG. 9 certain optional steps are illustrated in dashed lines. In some embodiments the present technology permits a user account to automatically check out a content item by opening (502) the content item from the native file system of client device 150. Just as in FIG. 7 regarding opening a content item that has already been checked out, in FIG. 9 client application 152 can learn that a content item has been opened (or requested to be opened) through several different methods. In a first option client application 152 can learn from file system extension 153 that the user account has requested the content item to be opened. File system extension 153 can detect (506) an operating system kernel level event requesting to open the content item. In some embodiments, file system extension 153 can detect (512) that the user account is attempting to save a change to the content item. After either detecting the content item open event (506), or the content item save event (512), client application 152 can notify workflow service 130 to set a content item lock (514). Just as in FIG. 7, client application 152 can also learn that a content item has been opened by using a UI watcher service (508) or a plug-in (510). When using the plug-in option, the plug-in can detect an edit (512) of the content item, which can optionally be the trigger to notify (514) workflow service 130 to set the content item lock.

In addition to the automatic content item locking addressed above, the present technology also allows for manual locking (504) of content items. In such embodiments a user account may interact with a content item either on client device 150 or through interaction with content management system 110 to select a menu option to check out the content item. For example FIG. 10A illustrates an example contextual menu with option 530 to check out the content item "strategy review.pdf." While FIG. 10A illustrates a user interface on example client device 150, a similar menu can be provided when interacting with content management system 110 using web browser 166 in communication with web interface service 124.

After the user account has manually checked out (504) the content item, client device 150 or web interface service 124 can notify (514) workflow service 130 to set a content item lock.

In some embodiments, when client application 152 determines that a content item that has been enrolled in workflow service 130 has been opened, client application 152 can provide prompt 532 as illustrated in FIG. 10B that informs the user account that the content item requires a checkout and can provide an option for the user account to check out the content item for a period of time and can provide an option to leave a message for other user accounts that have access to the shared content item. Any additional information provided through prompt 532 can also be sent to workflow service 130.

Workflow service 130 can record that the content item has been locked and the user account applying the lock in server file journal 148, and can also record this information along with additional information such as a checkout period or a comment associated with the content item check out in metadata database 146. Thereafter, content management system 110 can work with content item synchronization service 150 to sink (518) metadata pertaining to the workflow changes for the content item to client device 150.

Figure 11:
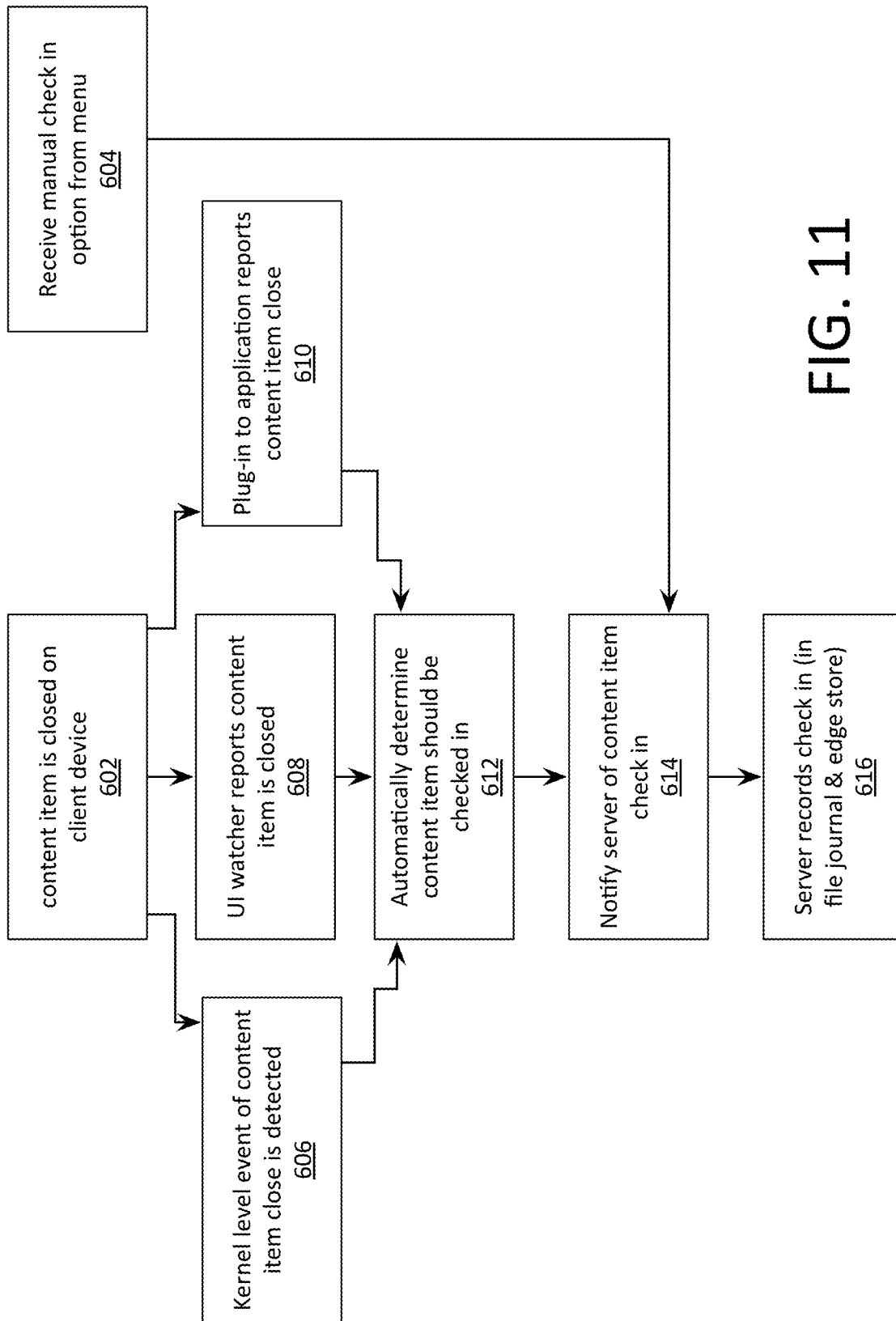
FIG. 11 illustrates an example method for automatically checking-in a content item in accordance with some embodiments.

FIG. 11 illustrates an example method for checking-in a content item. A major drawback of known content management systems providing check-in and checkout functionality is that such systems do not provide automatic check-in functionality when a content item is saved locally to a client device. In some instances, some known content management systems might not even automatically check-in a content item when the content item is closed and saved directly to a content management system server. This limitation of known content management systems leads to the undesirable result that often a user has finished working with a content item but the content item remains locked to all other team members.

The present technology can avoid these shortcomings through several options. First, in some embodiments, client application 152 can determine that a content item has been closed and can automatically instruct workflow service 130 to remove the lock on the content item. In some embodiments, a content item can be checked out for a defined duration of time such that content item locks can automatically expire.

Just as with respect to FIG. 7 and FIG. 9, FIG. 11 can utilize alternative methods for determining a content item has been closed. The method begins when a user account closes (602) a content item on client device 150. Client application 152 can learn that the content item has been closed through detecting a kernel level event (606), through receiving a report from a UI watcher tool (608), or by receiving a report from a plug-in to application (610) that was being used to edit the content item. Each of these options work as described above.

When client application 152 learns that the content item has been closed it can automatically determine that the content item should be checked-in (612). In some embodiments, client application can include a collection of rules to determine when it is appropriate to automatically check-in a content item. For example, if a timer for a check out has not expired at the time content item is closed, client application 152 can determine to not take any action because the checkout period has not expired. Alternatively if the checkout period has expired, or there was no check out period set but the content item was closed, client application 152 can determine that the content item should be checked-in. In some embodiments after determining that it is appropriate for content item to be checked-in, client application 152 can wait for a determined period of time to ensure that the content item close was not unintentional.

In some embodiments, client application 152 can be endowed with a machine learned function that has been trained on a data set of user declared content item check-ins, and client application 152 can apply the machine learned function to determine whether a content item should be automatically checked-in.

When a client application 152 automatically determines that the content item is ready to be checked-in, client application 152 can notify (614) workflow service 130 of content item check-in. Workflow service 130 can then record (616) the check-in in server file journal 148, and metadata database 146.

Figure 12A:
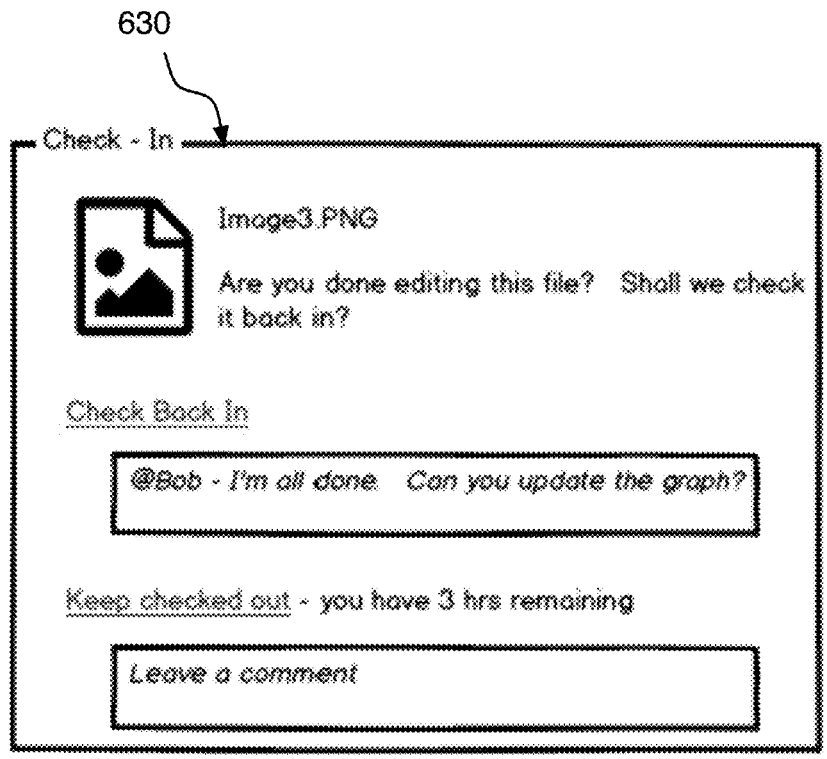
FIG. 12A and FIG. 12B illustrate example prompts regarding a check-in of a content item in accordance with some embodiments.
Figure 12B:
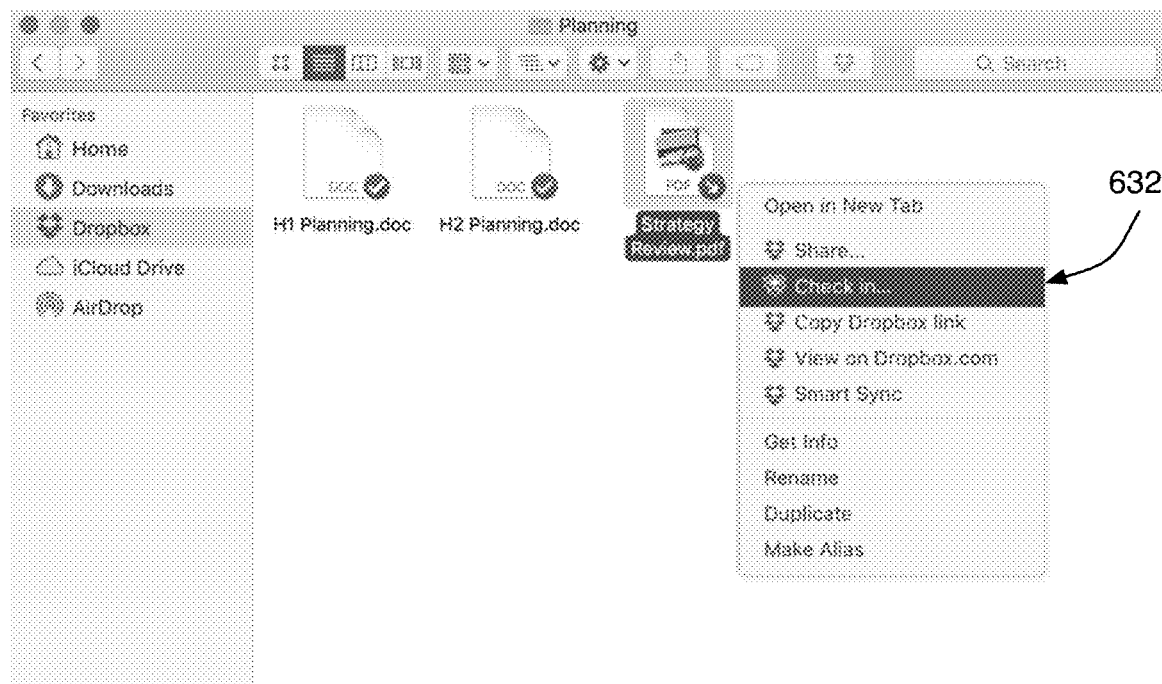

In some embodiments when client application 152 determines that the content item should be checked-in, client application 152 can present prompt 630 as illustrated in FIG. 12A to confirm that the content item should be checked-in. For example, prompt 630 can ask the user account if the content item should be checked back in, and provide selectable options to check the content item back in or keep the content item checked out.

In addition to client application 152 automatically determining that the content item should be checked back in, the user account can also manually check-in content items through interaction with a menu. FIG. 12B illustrates a contextual menu with a check-in option 632. While FIG. 12B illustrates a menu presented on client device 150, a similar menu could be presented on web browser 166 through web interface service 124. When a client device 150 or web interface service 124 receives (604) the manual check-in option the respective device can notify (614) workflow service 130 of content item check-in. Workflow service 130 can then record (616) the check-in in server file journal 148, and metadata database 146.

While the present technology has primarily been discussed in terms of a user account interacting with a content item through client device 150 having client application 152 installed thereon, or through the user account interacting with a content item through web interface service 124, the present technology can also be utilized by third party applications 180. Such applications can check-in and check out content items using workflow service 130 by interacting with workflow service 130 via application programming interfaces (API). For example some projects utilize a specialized application for managing a particular project. The project may include multiple content items and a team working on these content items. In this example, the specialized application can communicate with workflow service 130 via APIs to check out and check-in individual content items involved with the particular project.

As illustrated in FIG. 5, FIG. 7, FIG. 9, and FIG. 11, in some embodiments the present technology can make use of a file system extension 153 to inform client application 152 of events taking place with content items under its management in order to automatically check out or check-in a content item, or to provide a prompt to the user account of device 150. FIG. 13 and FIG. 14 illustrate example methods in additional detail regarding possible operations using file system extension 153.

FIG. 13 shows an example method 700 for detecting a kernel level file event for a content item according to various embodiments. A system performing example method 700 (e.g., client device 150) can begin and detect a kernel level file event for a content item (702). A content management system client application can have file system extension 153 for an operating system on client device 150 to perform at least some of example method 700.

As used herein, the "kernel" is a central part of an operating system that manages tasks that interface with hardware. It should be understood that "hardware" can mean physical hardware, simulated hardware (e.g., within a virtual machine, a network resource, a partition of a drive, buffer, RAM, etc.), or any system that has similar functionality of a hardware component. Similarly, a "kernel level file event" can be any event dealing with the content item or collection, or resource at a hardware (or similar) level. For example, loading a content item (e.g., opening or accessing the content item), saving a content item, modifying a content item or collection, accessing content item or collection properties, modifying content item or collection properties, moving a content item or collection, duplicating a content item or collection, defragmenting a content item or collection, etc. It should be understood that a kernel level file event can be an attempt at making any one of the foregoing, even if it is not accomplished (e.g., attempting to access a content item or collection that no longer exists, attempting to open a content item without sufficient permissions, etc.). The kernel level file event can be detected using file system extension 153 of client device 150 that is installed in the kernel of the operating system of client device 150.

In some embodiments, the kernel level file event can directly trigger step 702; alternatively, the system can monitor kernel level file events (e.g., by referencing a log) and begin step 702 when such an event is detected in the log. In some embodiments, step 702 pauses or otherwise interrupts the default operating system action for the kernel level file event (e.g., if a program instructs the operating system to open a content item, step 702 would pause or at least temporarily prevent the opening of the content item), alternatively, default behavior for the kernel level file event can run in parallel with example method 700. The kernel level file event can be triggered by a graphical user interface to a local file system (e.g., a file browser). In some embodiments, the kernel level file event is triggered by an interface (e.g., an application programming interface) to the local file system.

The system can continue and retrieve a file event instruction for the content item (step 704). A file event instruction can be any type of instruction, including instructions associated with the content item. For example, the instruction can include displaying a graphical user interface prompt, delaying the kernel level file event, sending a message about the content item (e.g., to content management system 110, another client device 150, a service on client device 150, a user account associated with the content item, etc.), decrypting/encrypting the content item, displaying a warning about the content item, modifying the content item, scanning the content item, duplicating the content item, retrieving collaboration information about the content item, retrieving a complete version of the content item (e.g., if the file event corresponds to a content item stub), etc.

The file event instruction can be retrieved from content management system 110 and/or client device 150. For example, the file event instruction can be stored on content management system 110 and retrieved by client device 150. The file event instruction can be retrieved from metadata associated with or located within the content item. In some embodiments, the metadata contains an address or pointer identifying a location of the file event instruction. In some embodiments, a general instruction (e.g., to open a collaboration screen before opening the content item) can apply to multiple content items and the implementation of the general instruction can be specific to the content item based on characteristics (e.g., content item type, tags, permissions, metadata, etc.) of the content item. This can be accomplished, for example, by using a content item identifier to adapt a general file event instruction to be specific to the content item.

The system can then perform the file event instruction (step 706). Various embodiments are herein disclosed for example sub-methods for step 706. In some embodiments, client device 150 can send a report of any one of step 702, 704, and/or 706 to content management system 110.

An example instruction of step 706 can include an instruction for handling or presenting the content item in cooperation with content management system 110. For example, content management system 110 can send client device 150 an access instruction (e.g., to open the content item in a read only, full access, or limited access mode) and an application that opens the content item can open the content item according to the access instruction.

FIG. 14 depicts an example method 750 according to various embodiments. Example method 750 can be a sub-method or alternative to step 706 for adapting the presentation of the content item based on an access state for the content item. For example, if a user of another client device 150 is currently accessing the content item, the content item might be "locked" with regards to the user that is attempting to access the content item (i.e., that triggered example method 750) and prevent that user from modifying the content item.

Client device 150 can begin and request the content item access state from content management system 110 (step 752). Access state can include an indication that the content item is currently opened by, being modified by, or reserved by a user (e.g., a user account). Access state can include an indication of a user or users that are attributable to the access state. For example that user X is currently viewing the content item.

Content management system 110 can then determine the content item access state by determining if another user is currently accessing the content item on another device (step 754). The "another device" in step 754 can be another client device 150. In some embodiments, step 754 includes reading an access log on content management system 110. Step 754 can include querying any client device 150 that might be accessing the content item. Content management system 110 can then send the content item access state to client device (step 755).

If the access state (step 756) is "full access" or similar, client device 150 can then open the content item in a full access mode (step 760). For example, the content item can be assigned read and write permissions. If the access state (step 756) is "read only" or similar, client device 150 can then open the content item in a read-only mode (step 758). For example, the content item can be opened without the ability to save over the content item. It should be understood that other access states are contemplated. For example, a "check out" access state may require a user to return the content item within a certain amount of time.

In some embodiments, content management system 110 can use example method 750 to determine a content item access restriction for the content item. For example, steps 754 and 755 can include determining a content item access restriction for the content item. This can include comparing the content item, the requesting user (e.g., a user account associated with client device 150), client device details (e.g., an identifier for client device 150), a device type of client device 150 (e.g., phone, tablet, or laptop), and/or a location of client device 150 (e.g., geo-location, IP address, or subnet) with an access control list for the content item. The content item access restriction can additionally or alternatively be determined by referring to the current activity states of other users currently associated with the content item (e.g., if they have the content item open, if they have unsaved changes to the content item, etc.). Content management system 110 can then determine a content item access restriction for the request. Client device 150 can enforce the content item access restriction. The content item access restriction can include indicating that the content item should have read-only, full, time-limited, or otherwise limited access permissions. In some embodiments, the content item access restriction limits the ability for the content item to saved or synchronized with content management system 110 (e.g., if another user account is currently accessing the content item). In some embodiments, the content item access restriction applies to a portion of the content item (e.g., a sentence, paragraph, page, row, column, cell, section, etc.). In some embodiments, client device 150 does not enforce the content item access restriction, but merely presents a notification indicating the content item access restriction.

In some embodiments, the "local" version is a stub content item while the "alternate" version is the complete content item. The term "stub" can refer to a placeholder that appears to be the complete content item within a file browser but the actual content item is located elsewhere. For example, the stub can be a content item with the same name, extension, metadata, etc. even though the stub lacks much of the content (i.e., the substance) of the content item. The stub can appear within a file interface of client device 150 to be the complete version of the content item. Client device 150 can detect a kernel level event for the stub content item and request the complete content item from content management system 110. Content management system 110 can then provide the complete content item to client device 150 for presentation. For example, the complete version can replace the stub in the file system. Alternatively or additionally, the complete version can be saved in a temporary location and the kernel level file event can be modified to point to the complete version (e.g., by changing the path for the content item). An application for presenting (including opening or loading) the content item can open the full version despite the stub being originally identified. When presentation of the content item is concluded (e.g., when the associated application closes the content item or saves the content item), client device 150 can update the stub content item and, if necessary, send an updated version of the complete content item to content management system 110.

Figure 15:
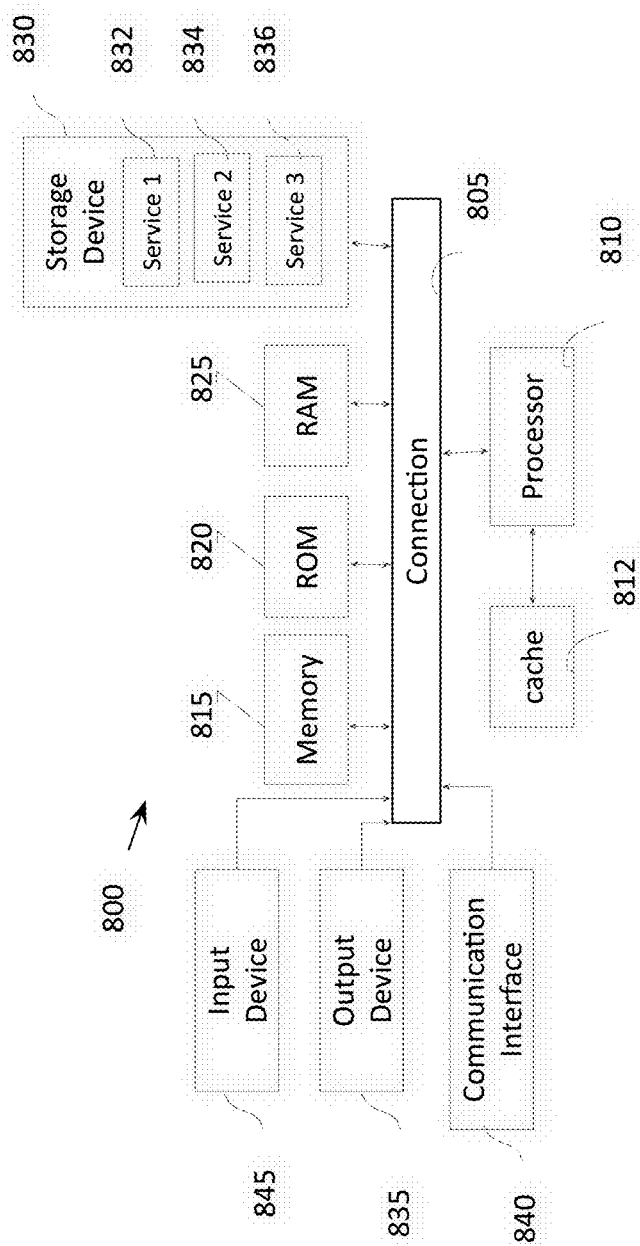
FIG. 15 illustrates an example possible system embodiment for implementing various embodiments of the present technology in accordance with some embodiments.

FIG. 15 shows an example of computing system 800. Computing system 800 can be for example a computing system of client device 150, or content management system 110. While these devices have some components in common, such as those illustrated in computing system 500, it should be appreciated that each of payment client device 150, or content management system 110 are specialized devices configured for their specific purposes.

In computing system 800 the components of the system are in communication with each other using connection 805. Connection 805 can be a physical connection via a bus, or a direct connection into processor 810, such as in a chipset architecture. Connection 805 can also be a virtual connection, networked connection, or logical connection.

In some embodiments computing system 800 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 800 includes at least one processing unit (CPU or processor) 810 and connection 805 that couples various system components including system memory 815, such as read only memory (ROM) and random access memory (RAM) to processor 810. Computing system 800 can include a cache of high-speed memory connected directly with, in close proximity to, or integrated as part of processor 810.

Processor 810 can include any general purpose processor and a hardware service or software service, such as services 832, 834, and 836 stored in storage device 830, configured to control processor 810 as well as a special-purpose processor where software instructions are incorporated into the actual processor design. Processor 810 may essentially be a completely self-contained computing system, containing multiple cores or processors, a bus, memory controller, cache, etc. A multi-core processor may be symmetric or asymmetric.

To enable user interaction, computing system 800 includes an input device 845, which can represent any number of input mechanisms, such as a microphone for speech, a touch-sensitive screen for gesture or graphical input, keyboard, mouse, motion input, speech, etc. Computing system 800 can also include output device 835, which can be one or more of a number of output mechanisms known to those of skill in the art. In some instances, multimodal systems can enable a user to provide multiple types of input/output to communicate with computing system 800. Computing system 800 can include communications interface 840, which can generally govern and manage the user input and system output. There is no restriction on operating on any particular hardware arrangement and therefore the basic features here may easily be substituted for improved hardware or firmware arrangements as they are developed.

Storage device 830 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read only memory (ROM), and/or some combination of these devices.

The storage device 830 can include software services, servers, services, etc., that when the code that defines such software is executed by the processor 810, it causes the system to perform a function. In some embodiments, a hardware service that performs a particular function can include the software component stored in a computer-readable medium in connection with the necessary hardware components, such as processor 810, connection 805, output device 835, etc., to carry out the function.

For clarity of explanation, in some instances the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program, or a collection of programs that carry out a specific function. In some embodiments, a service can be considered a server. The memory can be a non-transitory computer-readable medium.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, solid state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A computer-implemented method comprising:
   receiving, at a content management system from a first client device associated with a controlling user account, a communication for establishing a workflow control for a shared content item; and
   sending synchronization notifications to client devices associated with at least one first user account and at least one second user account, at least one of the synchronization notifications including workflow control metadata that identifies the at least one first user account as having read-write access, wherein the read-write access is reserved for the at least one first user account while access to the shared content item is temporarily changed to read-only for the at least one second user account, wherein the workflow control metadata is identical for each of the client devices.

2. The computer-implemented method of claim 1, wherein the workflow control metadata comprising attributes that label the shared content item as locked and by which user account.

3. The computer-implemented method of claim 1, wherein the workflow control metadata comprising attributes that label when or a duration of the workflow control will be placed into effect.

4. The computer-implemented method of claim 1, wherein the workflow control metadata is effective to provide each of the client devices with access permissions to be enforced locally at each of the client devices, respectively.

5. The computer-implemented method of claim 1, further comprising:
   receiving a second communication from one of the client devices to retrieve additional information from a metadata database about a workflow status of a locked content item.

6. The computer-implemented method of claim 5, further comprising:
   sending requested metadata sufficient for the one of the client devices to populate a prompt that includes information regarding a check-out status of the shared content item.

7. The computer-implemented method of claim 1, whereby any of the at least one second user account that is not identified in the synchronization notifications has read-only access during which the read-write access is reserved for the at least one first user account.

8. A non-transitory computer readable medium comprising instructions stored thereon, the instructions effective to cause one or more processors of a content management system to:
   receive, at the content management system from a first client device associated with a controlling user account, a communication for establishing a workflow control for a shared content item; and
   send synchronization notifications to client devices associated with at least one first user account and at least one second user account, at least one of the synchronization notifications including workflow control metadata that identifies the at least one first user account as having read-write access, wherein the read-write access is reserved for the at least one first user account while access to the shared content item is temporarily changed to read-only for the at least one second user account, wherein the workflow control metadata is identical for each of the client devices.

9. The non-transitory computer readable medium of claim 8, wherein the workflow control metadata comprising attributes that label the shared content item as locked and by which user account.

10. The non-transitory computer readable medium of claim 8, wherein the workflow control metadata comprising attributes that label when or a duration of the workflow control will be placed into effect.

11. The non-transitory computer readable medium of claim 8, wherein the workflow control metadata is effective to provide each of the client devices with access permissions to be enforced locally at each of the client devices, respectively.

12. The non-transitory computer readable medium of claim 11, further comprising instructions effective to cause the one or more processors of the content management system to:
receiving a second communication from one of the client devices to retrieve additional information from a metadata database about a workflow status of a locked content item.

13. The non-transitory computer readable medium of claim 12, further comprising instructions effective to cause the one or more processors of the content management system to:
sending requested metadata sufficient for the one of the client devices to populate a prompt that includes information regarding a check-out status of the shared content item.

14. The non-transitory computer readable medium of claim 8, whereby any of the at least one second user account that is not identified in the synchronization notifications has read-only access during which the read-write access is reserved for the at least one first user account.

15. A content management system comprising:
one or more processors; and
at least one computer readable medium storing computer readable instructions that, when executed by the one or more processors are effective to cause the content management system to:
receive, at the content management system from a first client device associated with a controlling user account, a communication for establishing a workflow control for a shared content item; and
send synchronization notifications to client devices associated with at least one first user account and at least one second user account, at least one of the synchronization notifications including workflow control metadata that identifies the at least one first user account as having read-write access, wherein the read-write access is reserved for the at least one first user account while access to the shared content item is temporarily changed to read-only for the at least one second user account, and wherein the workflow control metadata is identical for each of the client devices.

16. The content management system of claim 15, wherein the workflow control metadata comprising attributes that label the shared content item as locked and by which user account.

17. The content management system of claim 15, wherein the workflow control metadata comprising attributes that label when or a duration of the workflow control will be placed into effect.

\* \* \* \* \*